United States Patent
Busch et al.

(10) Patent No.: US 6,397,131 B1
(45) Date of Patent: *May 28, 2002

(54) METHOD AND SYSTEM FOR FACILITATING VEHICLE INSPECTION TO DETECT PREVIOUS DAMAGE AND REPAIRS

(75) Inventors: James L. Busch, Renton; Michael E. Sterling, Issaquah, both of WA (US)

(73) Assignee: Management Systems Data Service, Inc., Issaquah, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,110

(22) Filed: May 23, 2000

Related U.S. Application Data

(63) Continuation-in-part of application No. 09/428,677, filed on Oct. 27, 1999, now abandoned, which is a continuation of application No. 08/907,714, filed on Aug. 8, 1997, now Pat. No. 6,052,631.

(51) Int. Cl.[7] ................................................. G06G 7/00
(52) U.S. Cl. ............................. 701/29; 701/34; 701/31
(58) Field of Search ............................ 701/29, 35, 30, 701/34, 31; 705/4, 29, 30, 400; 700/83, 86, 87, 89; 73/196, 197.1, 117.2, 118.1, 117.3

(56) References Cited

U.S. PATENT DOCUMENTS

| | | | |
|---|---|---|---|
| 3,802,727 A | * | 4/1974 | Beckley ...................... 293/120 |
| 4,042,057 A | * | 8/1977 | Beckley ........................ 180/90 |
| 4,404,639 A | | 9/1983 | McGuire et al. ............. 364/551 |
| 4,549,267 A | | 10/1985 | Drabouski, Jr. .............. 364/463 |
| 4,757,463 A | | 7/1988 | Ballou et al. ................ 364/551 |
| 4,796,206 A | | 1/1989 | Boscove et al. ........ 364/551.01 |
| 4,817,016 A | | 3/1989 | Thompson et al. .......... 364/507 |
| 4,964,060 A | | 10/1990 | Hartsog ....................... 364/512 |

(List continued on next page.)

OTHER PUBLICATIONS

Honda Motor Co., Ltd., "Honda Manual, Chassis and Paint Codes," p. 1–2. Sep. 1993.

(List continued on next page.)

Primary Examiner—Jacques H. Louis-Jacques
(74) Attorney, Agent, or Firm—Seed IP Law Group PLLC

(57) ABSTRACT

Computer-based methods and systems for facilitating the inspection of a vehicle to detect the presence of damage and problems with previous repair and to guide the inspection, estimation, and repair of direct and indirect damage are provided. Exemplary embodiments provide an inspection facilitator, which includes an inspection engine and an inspection interface. The inspection engine and inspection interface can be implemented as an expert system, which directs a technician or apparatus to perform a uniform inspection process. When used to detect prior damage and problems with previous repair, the inspection facilitator, after receiving vehicle specific information, first directs and guides an inspection of the underbody of the vehicle to detect gross-level or relevant damage and repair. The inspection facilitator then dynamically directs and guides an inspection of the outerbody of the vehicle based upon the nonconformities indicated in response to each directed inspection task. When used to guide an inspection, estimate, and/or repair of direct and indirect damage, the inspection facilitator first directs an inspection of direct damage. The inspection facilitator then dynamically directs and guides an inspection of areas that are likely to have sustained indirect damage. The areas to be inspected and the inspection tasks are determined dynamically by comparing nonconformity input to facts and rules programmed into the inference engine of the inspection facilitator, in combination with retrieved manufacturing specifications, industry standard repair procedures, principles of energy management, and other relevant data.

62 Claims, 24 Drawing Sheets

U.S. PATENT DOCUMENTS

| | | | | |
|---|---|---|---|---|
| 4,977,524 A | | 12/1990 | Strege et al. | 364/562 |
| 5,036,479 A | | 7/1991 | Prednis et al. | 364/580 |
| 5,377,098 A | * | 12/1994 | Sakai | 705/29 |
| 5,432,904 A | | 7/1995 | Wong | 395/161 |
| 5,442,549 A | * | 8/1995 | Larson | 701/35 |
| 5,504,674 A | | 4/1996 | Chen et al. | 364/401 |
| 5,605,099 A | | 2/1997 | Sroka et al. | 104/2 |
| 5,657,233 A | | 8/1997 | Cherrington et al. | 364/464.1 |
| 5,717,595 A | | 2/1998 | Cherrington et al. | 364/464.1 |
| 5,839,112 A | * | 11/1998 | Schreitmueller et al. | 705/4 |
| 6,052,631 A | * | 4/2000 | Busch et al. | 701/29 |
| 6,055,860 A | * | 5/2000 | Pfanstiehl | 73/600 |
| 6,185,540 B1 | * | 2/2001 | Schreitmueller et al. | 705/4 |

OTHER PUBLICATIONS

National Insurance Crime Bureau, Marketing Literature, 1996.

Carfax, Information Sheets Regarding Online Vehicle History Service, 1994.

Hein–Werner Corporation, Shark Electronic Measuring System Literature, 1996.

Inter–Industry Conference on Auto Collision Repair, "I–CAR Uniform Collison Repair Procedures," May 1995.

I–CAR, Samples of "Uniform Procedures for Collision Repair," Ch. SP06, ST11, 1997.

WreckChecks, Inc., "WreckCheck" Product Literature, 1996.

SoftShell Technologies, Inc. "Visual Expert Version 3.0, User's Guide," 1995.

SoftShell Technologies, Inc., "Visual Expert Version 3.0, Getting Started," 1995.

Automatic Data Processing, Inc., "Reference Manual," 1995.

CCC Information Services, Inc. "EZEst 4.0 Overview," pre–1995.

CCC Information Services, Inc. "EZEst 4.32 User's Manual Addendum," Title Page, 1995.

\* cited by examiner

MSDS Registration Form — 301

Registered Owner:

- First Name: [fname]   Last Name: [lname]
- Address: [address]
- City: [city]   State: [state]   ZIP: [zip]
- Phone: [phone]   Alt. Phone: [phone2]
- Legal Owner: [oname]

Vehicle Information:

- Year: [year]   Model: [model]   Color: [color]
- Make: [make]   Body: [body]   Mileage: [mileage]
- License #: [license]
- VIN #: [vir][vir][vir][vir][vir][vir][vir][vir][vir][vir][vir][vir][vir][vir][vir][vir][vir]   State: [state2]
- Security #: [Check4]   Date: [DD]
- Client Account #: [client_account]   Time: [TI] [day]

Direct and Indirect damage

METHOD AND SYSTEM FOR FACILITATING VEHICLE INSPECTION TO DETECT PREVIOUS DAMAGE AND REPAIRS

CROSS-REFERENCE TO RELATED APPLICATIONS

This application is a continuation-in-part of U.S. patent application Ser. No. 09/428,677, filed Oct. 27, 1999, now abandoned which is a continuation of U.S. patent application Ser. No. 08/907,714, filed Aug. 8, 1997, which issued as U.S. Pat. No. 6,052,631, on Apr. 18, 2000.

TECHNICAL FIELD

The present invention relates to vehicle inspection and, in particular, to computer software that facilitates uniform inspections of vehicles for damage and for substandard repairs.

BACKGROUND OF THE INVENTION

One of the most disturbing consumer protection problems in the automotive collision repair industry is caused by the improper repair of vehicles that have been declared "total loss" vehicles by insurance companies, typically as a result of being involved in accidents, natural disasters, or vandalism. An insurance company typically declares a vehicle a total loss when the cost to repair the vehicle exceeds 75% of the actual cash value of the vehicle. Often, when these total loss vehicles are repaired, they are not returned to pre-accident condition, because repairing such vehicles to industry standards (restoring them) is not cost-effective. Improperly repaired total loss vehicles give rise to consumer protection problems and pose significant safety hazards.

Specifically, improperly repaired vehicles may not perform safely under normal driving conditions and, in collisions, can literally fall apart. Current law does not uniformly require that a consumer be forewarned that a particular vehicle is a repaired total loss vehicle when it is purchased. Thus, buyers can unknowingly purchase improperly repaired vehicles that give rise to unexpected costly repairs when latent problems are later discovered. In addition, when the buyer discovers a problem with such a vehicle, the value of the vehicle to the buyer is diminished. If the buyer had known of the improper repairs or damage at the time of purchase, the buyer may not have purchased the vehicle at all. Also, improper repair of such vehicles gives rise to increased costs to insurance companies, because insurance claims are more frequent and costly for improperly rebuilt vehicles. The increase in frequency and cost of insurance claims typically results in increased premiums for consumers in general. Thus, costs of repairs and insurance, diminished value, and serious safety problems pose a significant consumer protection problem to the industry and to the public.

Also, government regulatory agencies have had difficulty regulating consumer protection laws for repaired total loss vehicles, because it is often difficult to detect camouflaged damage and substandard repairs after the fact and because there is no industry standard by which to assess the quality of repairs to a damaged vehicle. In addition, an affected consumer is often not aware that the vehicle has been damaged and repaired if no inspection is performed. Thus, it is not always evident when and how to apply preventive consumer protection regulations. Also, repairs to damaged vehicles are often camouflaged and are difficult for an untrained technician to detect. Currently, collision repair technicians visually inspect such vehicles, completely relying on their individual levels of training and expertise to make judgments regarding the quality of the repairs performed to such vehicles. The quality of each inspection is thus subjective and is not uniform from vehicle to vehicle.

Current automobile-related computer systems are directed to estimating the costs of repairs of known damage and to the diagnosis of known operability problems. For example, computer systems exist for estimating salvage value at the time a vehicle is being repaired for known collision damage. These systems are employed to provide salvage-related damage information to insurance companies. There are also computer-based estimating systems for estimating the cost of repairs, once the repairs have been determined. In addition, computer-based diagnosis systems exist for diagnosing faults in automobile engines and for diagnosing current operating problems, such as those caused by improper wheel alignment. These diagnosis systems examine only particular subsystems of a vehicle. All of these systems operate when there is known damage or known operability problems with a vehicle.

In addition to these problems, a vehicle that has been involved in a collision may be improperly repaired because the estimator and/or technician fails to detect and hence repair secondary damage that has resulted from the collision, but that is not directly evidenced at the point of impact. Such damage may not be obvious upon visual inspection of the damaged vehicle. Thus, the quality of the is repairs performed is dependent on the expertise of the estimator and technician. For example, damage of areas other than at the point of impact may be caused by shock waves reverberating through the vehicle body upon impact. Such secondary damage is known as "indirect damage" or "hidden damage" and is difficult to detect unless the technician is familiar with the energy management (energy absorption) design of the particular vehicle. Thus, indirect damage is often left undetected and is not assessed.

SUMMARY OF THE INVENTION

Embodiments of the present invention provide computer-based methods and systems for facilitating the inspection of a vehicle to detect the presence of direct and indirect damage and problems with previous repair to the vehicle. Example embodiments provide an inspection facilitator, which includes an inspection engine and an inspection interface. The inspection engine and inspection interface interact to direct a technician or an apparatus to perform a uniform inspection process, capable of detecting pre-existing damage, camouflaged damage, direct and indirect damage, and substandard repairs.

The inspection facilitator directs a general inspection process as follows. After receiving vehicle identification information, the inspection facilitator retrieves vehicle-specific manufacturer's specifications and standardized repair procedures. The inspection facilitator then directs the inspection of the underbody portion of the vehicle to determine whether the alignment measurements of the underbody conform to the manufacturer's specifications. Underbody alignment measurements serve as reasonable indicators of damage or repair when the measurements are not within manufacturer-specified tolerances that have been adjusted for the age and use of the vehicle. Based upon the underbody inspection results, the inspection facilitator directs the inspection of the outerbody portion of the vehicle taking into account any detected nonconformities and proper repair procedures for the vehicle. An assumption underlying the computer-based vehicle inspection process is that if standardized repair procedures had been properly followed, the vehicle would have been returned to pre-damage condition. For each task in the inspection process of the outerbody, nonconformities are indicated, and the inspection facilitator dynamically determines and directs the inspection of additional areas based upon previous nonconformity indications. For example, an indication of excessive gaps between the hood and fenders may eventually lead to further inspection for evidence of welding to detect parts replacement. After the determined inspection areas have been explored, the inspection process is complete. The inspection facilitator then determines an indication of an overall condition of the vehicle based upon the inspection results generated for each inspected area.

In an exemplary embodiment, the overall condition of the vehicle indicates one of: (1) no serious damage has occurred to the vehicle; (2) damage has occurred, but has been repaired to industry standards; (3) damage has occurred and has not been repaired to industry standards; and (4) damage has occurred and the vehicle is unsafe. In some embodiments, the inspection facilitator provides a certificate of structural integrity to indicate the overall condition of the vehicle. The structural integrity certificate can be used to identify vehicles having substandard repairs.

One mechanism for determining the overall condition of the vehicle includes assigning a numeric weight to each indicated nonconformity and combining the weighted nonconformities at the end of the inspection process to determine an overall defect rating of the vehicle. Numeric weights are assigned based upon a determination of whether the nonconformity is a cosmetic defect, a poor quality repair, or a serious safety defect. In addition, the overall defect rating is qualified according to vehicle age, usage, and current value rate qualifiers. Other weighting systems and rating qualifiers may be incorporated.

In addition, according to some embodiments, the inspection facilitator generates customized reports that contain certain information, for example, the reporting of nonconformities in certain areas and not others. For example, a report for use in litigation can be generated to report a likely site or cause of a failure in a certain vehicle part, or other factors related to liability in personal injury claims. As another example, a report can be generated for insurance adjusters, which reports the extent and adequacy of past repair on vehicles of a similar type and the extent and cost of current repair. Similarly, reports can be generated for government regulatory agencies to report vehicle information for vehicles with substandard repairs or having stolen parts. Also, reports can be customized to incorporate state specific or nationality specific requirements.

The inspection facilitator can be used to direct a technician to manually input inspection data or can be used to direct various apparatuses to provide inspection data. In addition, the inspection facilitator can determine whether the inspection data is conforming or non-conforming or the technician or apparatus can perform and input this determination.

Also, in some embodiments, the inspection data obtained from an inspection process directed by the inspection facilitator is stored in a data base. Further, the inspection data can be provided upon request to interested third parties, such as government regulatory agencies.

In addition to the detection of damage and substandard repairs, in some embodiments, the inspection facilitator determines whether a vehicle identification number ("VIN") has been altered and whether stolen vehicle parts are present on the vehicle.

In other embodiments, the inspection facilitator is used to guide uniform inspections and/or repair of direct and indirect damage when a collision has occurred. In some embodiments, the inspection facilitator indicates the direct and indirect damage and indicates an ordered set of repairs to be performed to the vehicle. For example, an estimator can use the inspection facilitator to generate a more complete estimate of repairs needed as a result of both direct and indirect damage. In addition, a repair technician can use the inspection facilitator as a guide during the repair process so that repairs are processed in the correct order and so that all damage, direct and indirect, is repaired.

The inspection facilitator directs an inspection process of direct and indirect damage in a similar manner to the general inspection process described above. After receiving vehicle identification information, the inspection facilitator retrieves vehicle-specific manufacturer's specifications and standardized repair procedures. The inspection facilitator then directs an inspection of the outerbody portion of the vehicle (which is typically a unibody frame in contemporary vehicles) to determine whether the measurements of specific portions of the unibody frame conform to the manufacturer's specifications, taking into account any detected nonconformities and proper repair procedures. Then, for each task in the inspection process of the outerbody, nonconformities are indicated, and the inspection facilitator dynamically determines and directs the inspection of additional areas based upon previous nonconformity indications. After the determined inspection areas have been explored, the inspection process is complete. The inspection facilitator may optionally produce a report, which may include estimates of the repairs needed or a specific repair sequence and instructions. Similarly, the inspection facilitator may generate repair instructions and be used to guide the actual repair process, to insure that repairs are performed in the right order and do not miss nonconformities.

In some embodiments, the inspection facilitator is implemented using an expert system, which provides an inference engine and knowledge base to determine the areas to be inspected and to direct the flow of the inspection and/or repair process. Using expert system technology, embodiments of the present invention can facilitate providing uniform after-repair inspections of vehicles to detect damage and repair problems; uniform pre-repair inspections and estimates to comprehensively indicate necessary repairs, and step-by-step repair guidance.

BRIEF DESCRIPTION OF THE DRAWINGS

FIG. 3 is an example display screen generated and presented by the inspection facilitator to retrieve vehicle-specific information.

DETAILED DESCRIPTION OF THE INVENTION

Figure 1:
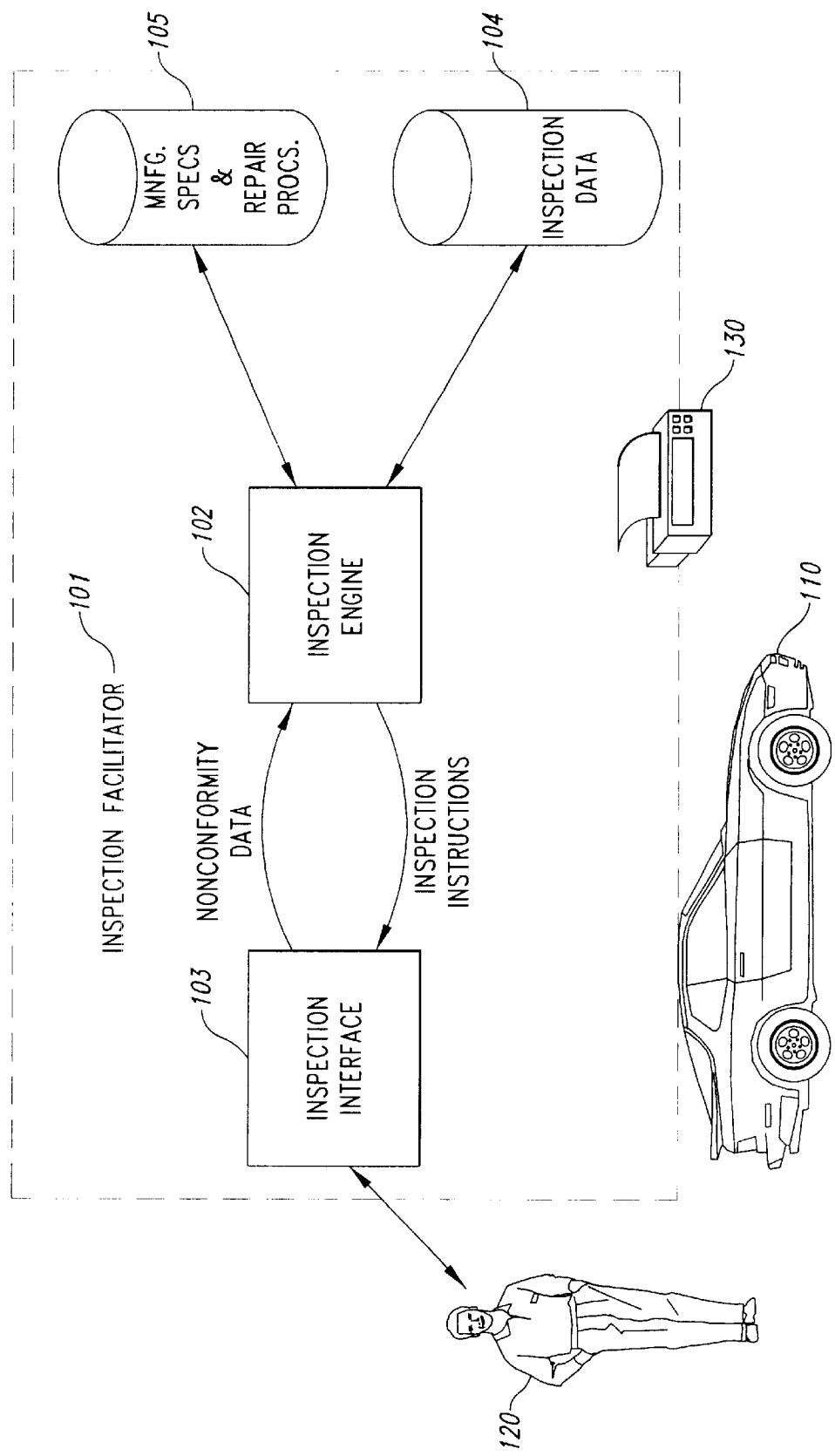
FIG. 1 is an example block diagram of an exemplary embodiment of the inspection facilitator of the present invention.

Embodiments of the present invention provide methods and systems for facilitating the inspection of an automotive vehicle to detect camouflaged damage or substandard repair, even when it is unknown whether the vehicle has been previously damaged or repaired. Additional embodiments of the present invention provide methods and systems for facilitating the inspection of an automotive vehicle to determine direct and indirect damage and to develop a comprehensive repair plan. Although described with reference to automotive vehicles, one skilled in the art will recognize that the methods and systems described and their teachings are applicable to other vehicles and to other modes of transportation, including vessels, aircraft, and other conveyances. All such conveyances generically are referred to herein as "vehicles."

Exemplary embodiments provide an inspection facilitator to guide a technician or an apparatus through an inspection process to indicate nonconformities with manufacturer's specifications and with standardized repair procedures. The indicated nonconformities are interpreted by the inspection facilitator to further guide the inspection and to draw conclusions regarding the vehicle's overall damage and repair history. When used to guide or determine a proper repair process, the inspection facilitator provided by exemplary embodiments guides the technician, estimator, or an apparatus, through a similar inspection process that indicates nonconformities due to direct and indirect damage. These nonconformities are interpreted by the inspection facilitator to further guide the inspection and to indicate the proper repairs that are deemed necessary.

In an exemplary embodiment, the inspection facilitator is implemented as an expert system. An expert system is a type of computer program that makes decisions or solves problems in a particular field using knowledge and analytical rules defined by experts in the field. Thus, an expert system helps non-experts arrive at the same conclusions and perform the same operations as experienced specialists. Moreover, by using an expert system, each inspection is performed in a uniform manner, which is repeatable by different technicians with varying expertise.

The inspection facilitator relies on a principle that any repairs performed to a damaged vehicle using industry standard repair procedures will return the vehicle to pre-damaged condition. Thus, by guiding the examination of the vehicle to determine if certain repairs were properly performed when a defect or damage is indicated, the inspection facilitator can identify additional areas to inspect based upon related repairs that should have been performed to properly repair the vehicle. Preferably, both the underbody (e.g., a unibody frame) and the outerbody (e.g., doors, fenders, hood, etc.) of the vehicle are examined to look for nonconformities with manufacturer's specifications and with industry standard repair procedures. In addition, the inspection facilitator guides an inspection that automatically adjusts for the age and the use (for example, as reflected in current mileage) of the vehicle. Using these techniques and principles, embodiments of the present invention provide a standardized mechanism for assessing the quality of repairs to collision-damaged vehicles through uniform after-repair inspections.

FIG. 1 is an example block diagram of an exemplary embodiment of the inspection facilitator of the present invention. Inspection facilitator 101 comprises an inspection engine 102, an inspection user interface 103, and one or more data repositories 104 and 105 for storing vehicle-related and inspection-related information. The inspection engine 102 sends inspection instructions to the inspection user interface 103, which directs the inspection of a vehicle 110 by a technician 120 or by an apparatus (not shown). The technician 120 performs measurements on the vehicle 110 as directed and provides the result of such measurements and other requested inspections items to the inspection user interface 103. For example, the technician 120 may indicate that a particular item to be inspected does not conform to the manufacturing tolerances or repair specifications for that vehicle. The indicated inspection data is forwarded by the inspection user interface 103 to the inspection engine 102. The inspection engine 102 then determines a next inspection task based upon standardized repair procedures and manufacturing specifications retrieved from the data repository 105 and the nonconformities indicated thus far by the inspection interface 103. The inspection engine 102 records inspection data determined during the inspection process in the data repository 104. After the inspection process is complete, the inspection engine 102 generates output data that contains inspection results. This output data may be displayed to the technician via the inspection user interface 103 or may be produced on an output device, such as a printer 130. In addition, the inspection engine 102 may produce customized reports of the inspection data and results, which may include a structural integrity certificate.

Although in the embodiment described the inspection facilitator directs a technician to inspect the vehicle, one skilled in the art will recognize that the inspection facilitator may be directly connected to an apparatus that is capable of performing measurements on the vehicle and reporting the results of these measurements. It is to be understood that the mechanisms and techniques described with reference to a technician can also be applied to such a measurement apparatus. In addition, when the inspection facilitator is directly connected to such an apparatus, the inspection engine may communicate directly with the apparatus and may not need to provide an inspection user interface. It is also to be understood that the inspection facilitator may be used by persons other than technicians, for example estimators, insurance adjusters, or any other similar personnel with a need to estimate or determine necessary repairs.

Also, one skilled in the art will recognize that the manufacturer's specifications and the repair specifications, shown as residing on data repository 105, may instead be available via remote repositories provided by other systems. In addition, the inspection data obtained by the inspection facilitator may be used by the inspection facilitator alone, or may be provided to external third parties via additional interfaces (not shown). Further, the collected inspection data may be uploaded to another facility to provide a nationally or an internationally available record of the inspection data, for example, using a global network such as the Internet.

Guiding a General Inspection Process

In one example embodiment, the inspection process that is directed and guided by the inspection facilitator can be viewed conceptually as occurring in three stages. In the first stage, Stage I, the inspection facilitator directs the inspection of the underbody of the vehicle to generally assess whether there has been previous damage to the vehicle. The underbody is considered to be a good general indicator of prior damage, because often improper repair will result in poor alignment of the underbody components (e.g., a unibody frame). Typically, the underbody of a vehicle is inspected by a technician utilizing an electronic three-dimensional measuring device. The inspection facilitator directs the technician to obtain certain measurements of the center, front, and rear sections of the vehicle's underbody. Original equipment manufacturer ("OEM") specifications that are specific to the vehicle, as modified by the age and use of the vehicle, are presented as acceptable tolerances. The technician performing the inspection indicates to the inspection facilitator the extent of any deviations from these tolerances. In addition, where applicable, an industry standard repair tolerance (e.g., a three millimeter tolerance) may be used to adjust the tolerance or deviation values. The indicated deviations are interpreted and processed by the inspection facilitator to determine areas of potential damage and/or repair.

In the second stage, Stage II, the inspection facilitator directs the inspection of the outerbody of the vehicle to determine whether the vehicle conforms to OEM specified tolerances for "fit and finish," as modified by the age and use of the vehicle. Subtle disturbances of fit and finish are sometimes indicators of major repair work hidden underneath. The purpose of the Stage II inspection is to identify the locations of previous repair work and whether such repair work generally conforms with the fit and finish tolerances. If not, the Stage II inspection serves as an indication that additional inspection is needed to determine the severity of substandard repairs or to further identify camouflaged damage. The Stage II inspection is typically performed by a technician by visually scanning the center, front, and rear sections of the outerbody according to instructions displayed by the inspection facilitator and by operating a body scanner apparatus to identify, for example, the depth of paint and vehicle areas that have been repaired with plastic. The technician is responsible for indicating any areas that do not conform with the specified tolerances. Where applicable, an industry standard tolerance (e.g., a three millimeter tolerance) may be used to adjust the tolerance or nonconformity values. Typically, the technician indicates an area as nonconforming and may supply further information to grade the severity of the nonconformity. Alternatively, the technician supplies a measurement, and the inspection facilitator determines whether the measurement is conforming or nonconforming. The inspection facilitator processes the nonconformity information to determine whether to certify the vehicle as "undamaged" or "damaged but properly repaired" or whether to further direct the inspection process to Stage III to identify substandard repairs and camouflaged damage.

Failure of a vehicle to pass the Stage I and Stage II inspections indicates that the vehicle has sustained major damage, which may or may not have been properly repaired. In the third stage, Stage III, the inspection facilitator directs further inspection of the outerbody of the vehicle to look for items such as paint mismatch and overspray, and evidence of frame work, welding, tampering, and other types of repair or removal evidence. During Stage III, the technician identifies nonconformities with standardized repair procedures as directed by the inspection facilitator. The inspection facilitator uses the repair specifications appropriate to the vehicle to guide the technician to certain locations to inspect and to the characteristics to search for. For example, when inspecting for evidence of welding, the technician is instructed to pay specific attention to the radiator support and inner fender aprons.

For the purposes of this description, any standardized vehicle repair procedures can be utilized as long as they are stored in computer-readable form. For example, repair procedures such as those published by the Inter-Industry Conference on Auto Collision Repair ("I-CAR") may be used. I-CAR provides uniform repair procedures organized by task area. For example, step-wise, illustrated procedures are available for structural straightening, fender repairs, welding, and for many other tasks. Detailed descriptions of the currently available repair procedures are described in *I-CAR Uniform Collision Repair Procedures*, Inter-Industry Conference on Auto Collision Repair, V 1.2, 1997, which is hereby incorporated by reference in its entirety. Also, for the purposes of this description, any publication of manufacturer's specifications can be utilized as long as the specifications are stored in computer-readable form. Manufacturer's specifications are commercially available, for example, from Mitchell International, Inc., KLM Automotive Publishing, and others. One skilled in the art will recognize that the inspection facilitator is appropriately coded to understand the formats of the particular repair procedures and manufacturer's specification selected for use.

FIGS. 2–11 provide an example sequence of display screens produced by the inspection facilitator to direct and guide an example inspection of a vehicle. These display screens illustrate an example flow of an inspection process that is directed by the inspection facilitator when a misalignment is found within the front section of the underbody of the vehicle.

Figure 2:
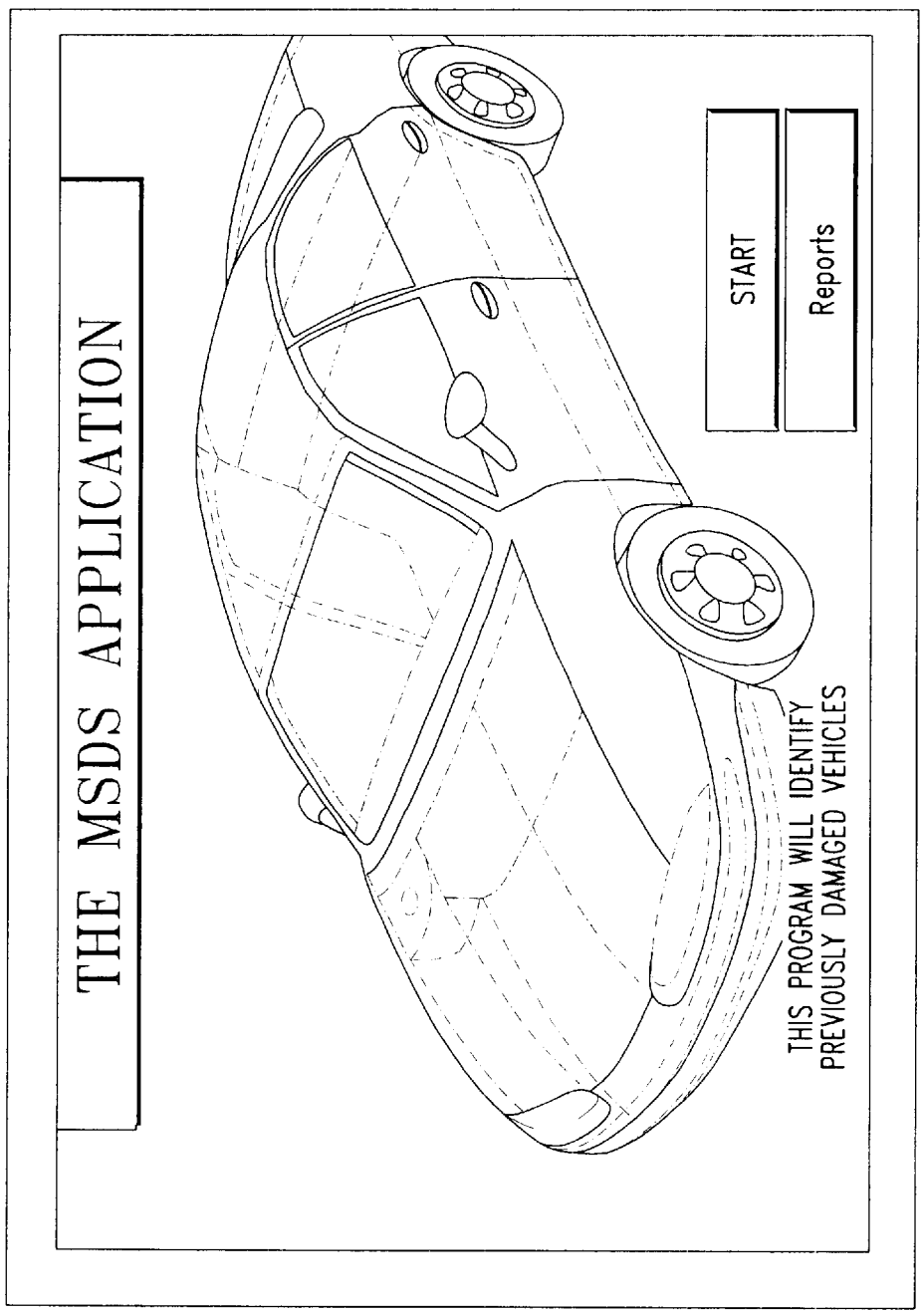
FIG. 2 is an example display screen of an initial display generated by the inspection facilitator.

FIG. 2 is an example display screen of an initial display generated by the inspection facilitator.

FIG. 3 is an example display screen generated and presented by the inspection facilitator to retrieve vehicle-specific information. A dialog box 301 with multiple input fields is displayed to obtain vehicle-specific and owner-specific information. One of these fields is the vehicle identification number ("VIN") field 302, which identifies the vehicle year and which can be used by the inspection facilitator to determine whether the VIN has been altered and whether there are any stolen parts present on the vehicle. For example, the component fields of a VIN entered as "JHMCD5544RC013927" can be decoded to identify a Honda manufactured in Japan, Accord sedan, 4-door 5-speed transmission, LX, 1994, manufactured in Saitama, Japan with a serial number of 013927.

Figure 4:
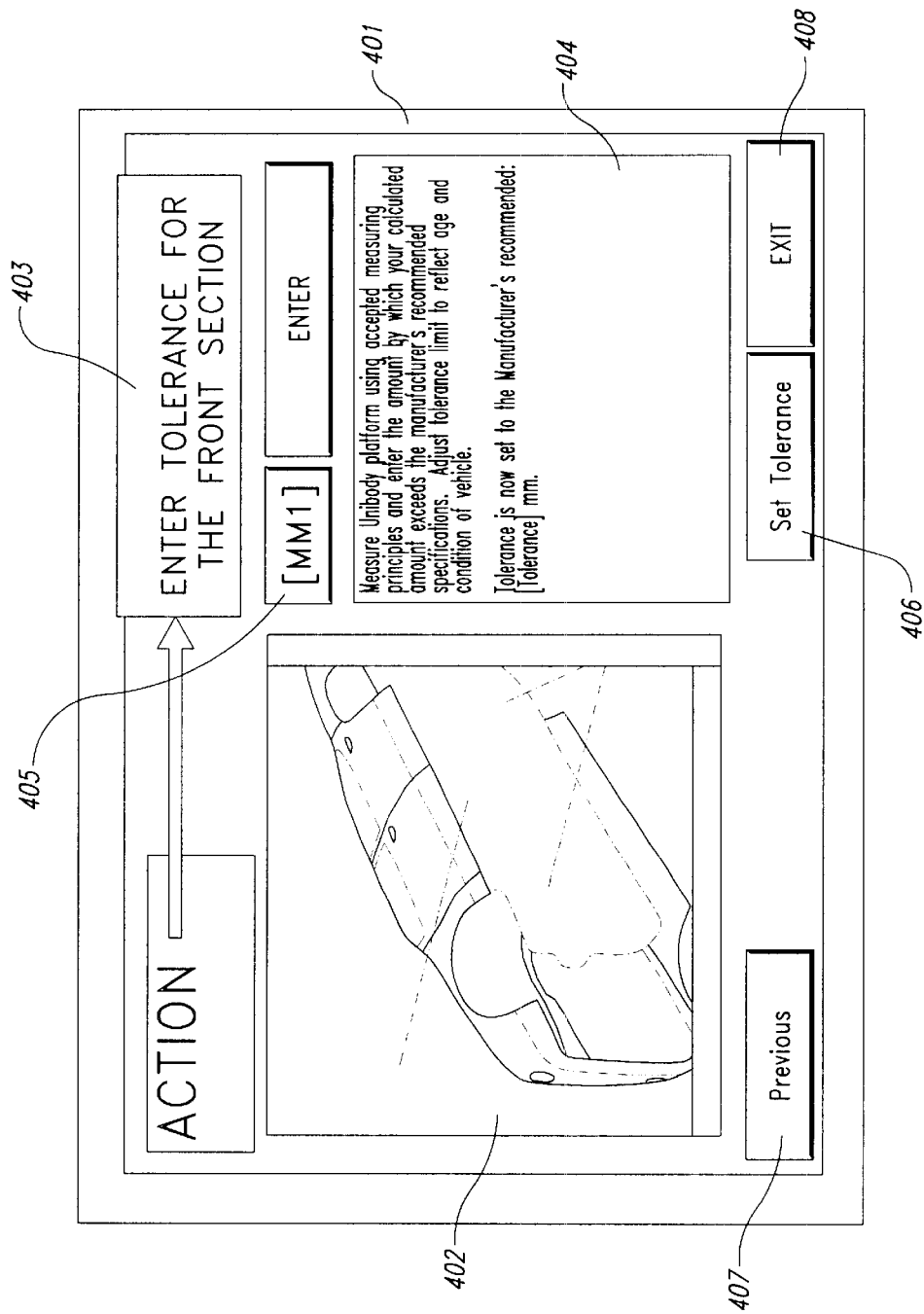
FIG. 4 is an example display screen generated and presented by the inspection facilitator to direct an inspection of the front section of the underbody of a vehicle.

FIG. 4 is an example display screen generated and presented by the inspection facilitator to direct an inspection of the front section of the underbody of a vehicle. As with most of the inspection direction screens, the display screen 401 includes a graphics area 402, a task identification area 403, an instruction display area 404, and an input area 405. In addition, pushbuttons 406–408 are provided, for example, to override the manufacturer's recommended tolerances, to return to the previous inspection task, and to exit from the inspection facilitator program.

One skilled in the art will recognize that the inspection direction screens shown in FIGS. 4–11 may be modified to include additional user interface components and may be rearranged into other data and input arrangements. Note that the illustration displayed in graphic display area 402 shows a graphical representation of the area of the car to be inspected and an indication of the parts to be inspected. In the graphic display area 402, the dotted lines indicate where the measurement device is to be placed to obtain alignment measurements for the front section of the underbody.

For the purposes of example, it is assumed that the inspection of the front section of the underbody, as directed by FIG. 4, yields a nonconformity. At this point, the inspection facilitator determines that front section misalignment of the frame is likely indicative of outerbody repairs to the front section. Accordingly, the inspection facilitator directs an inspection of the hood to fender gaps and the hood to cowl gaps, which may indicate improper repair to the front section of the outerbody.

Figure 5:
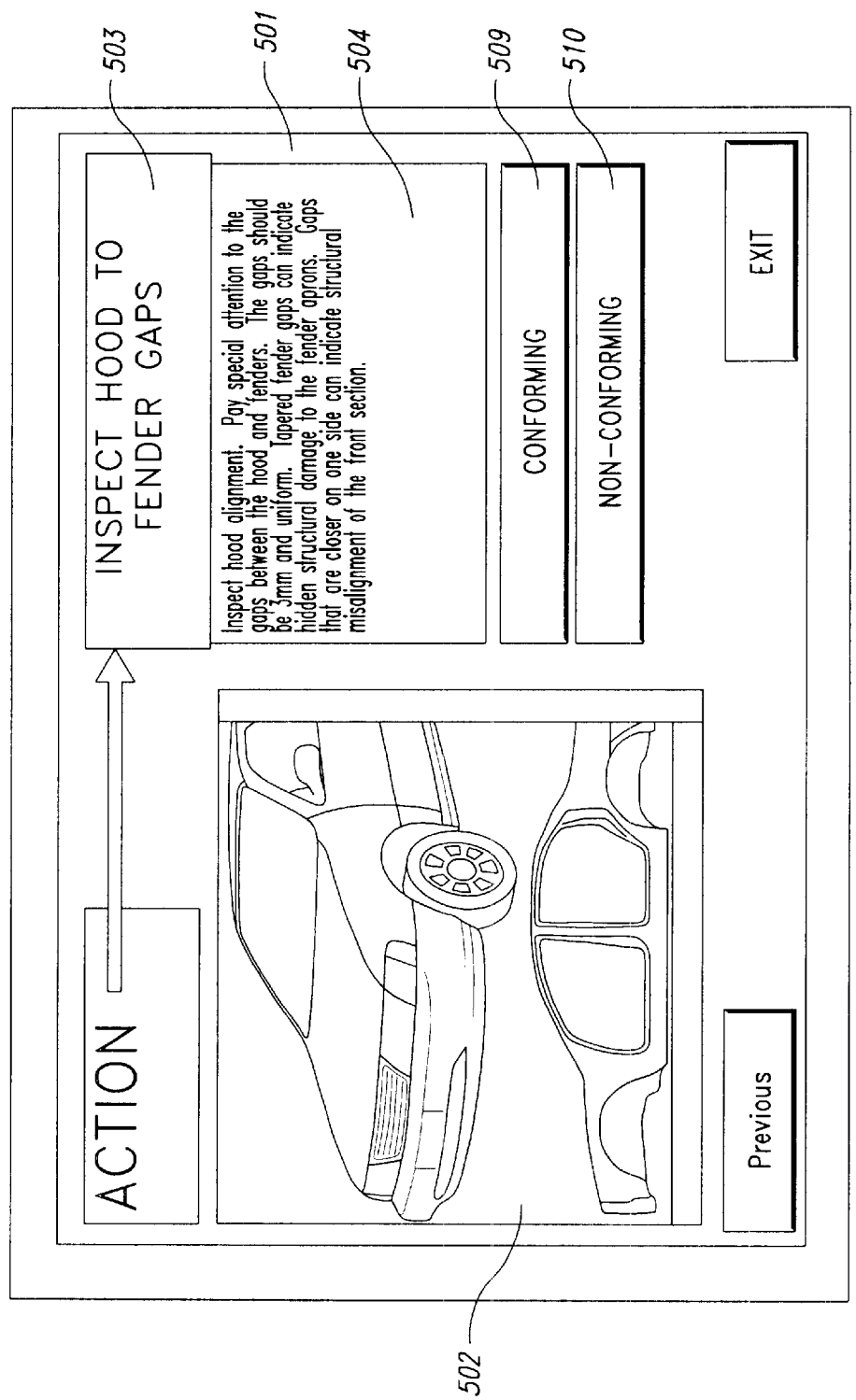
FIG. 5 is an example display screen generated and presented by the inspection facilitator to direct an inspection of hood to fender gaps.

FIG. 5 is an example display screen generated and presented by the inspection facilitator to direct an inspection of hood to fender gaps. This display screen is presented as part of the Stage II inspection process when a front end misalignment has been indicated after inspecting the underbody of the vehicle. The task identification area 503 indicates that the areas to be inspected are the gaps between the hood and the fenders. Instruction display area 504 displays specific instructions regarding inspecting hood alignment and indicates the abnormalities the technician should look for. The graphics area 502 displays the portion of the vehicle where the gaps between the fenders and the hood are found. In addition, display screen 501 includes a Conforming pushbutton 509 and a Nonconforming pushbutton 510, which are depressed by the technician to indicate a conforming part or a nonconforming item, respectively. When a nonconforming item is indicated as a result of depressing pushbutton 510, then the inspection facilitator displays a defect grading dialog to allow the technician to indicate the location and the severity of the defect.

Figure 6:
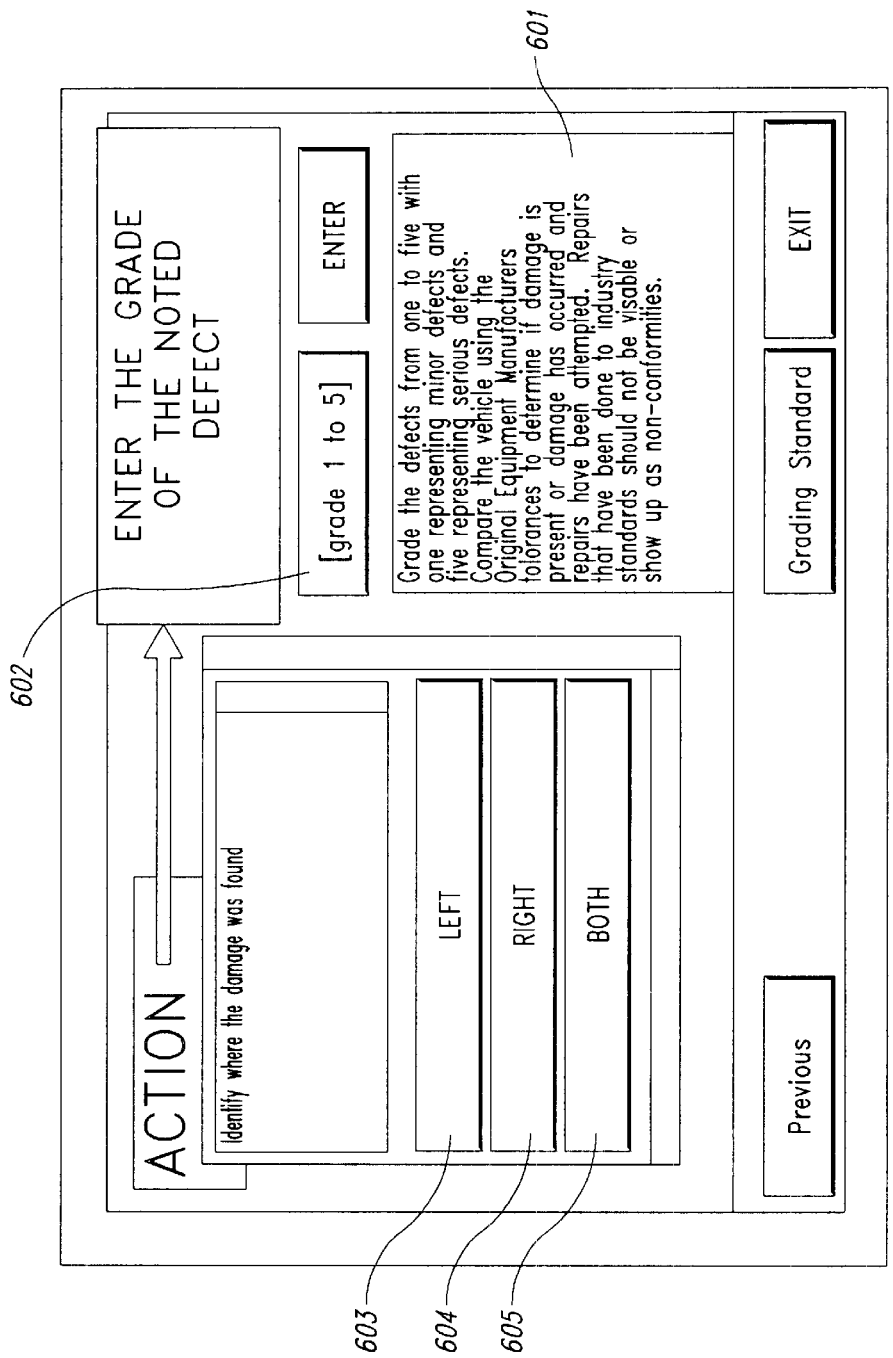
FIG. 6 is an example display screen generated and presented by the inspection facilitator to grade an indicated defect.

FIG. 6 is an example display screen generated and presented by the inspection facilitator to grade an indicated defect. This display screen is presented each time a nonconforming area is indicated by the technician. The dialog box 601 provides an input field 602 for indicating a grade for the defect from 1 to 5 (5 being the most severe). In addition, pushbuttons 603, 604, and 605 are provided to indicate whether the defect occurs on the left side, the right side, or both sides of the car.

Figure 7:
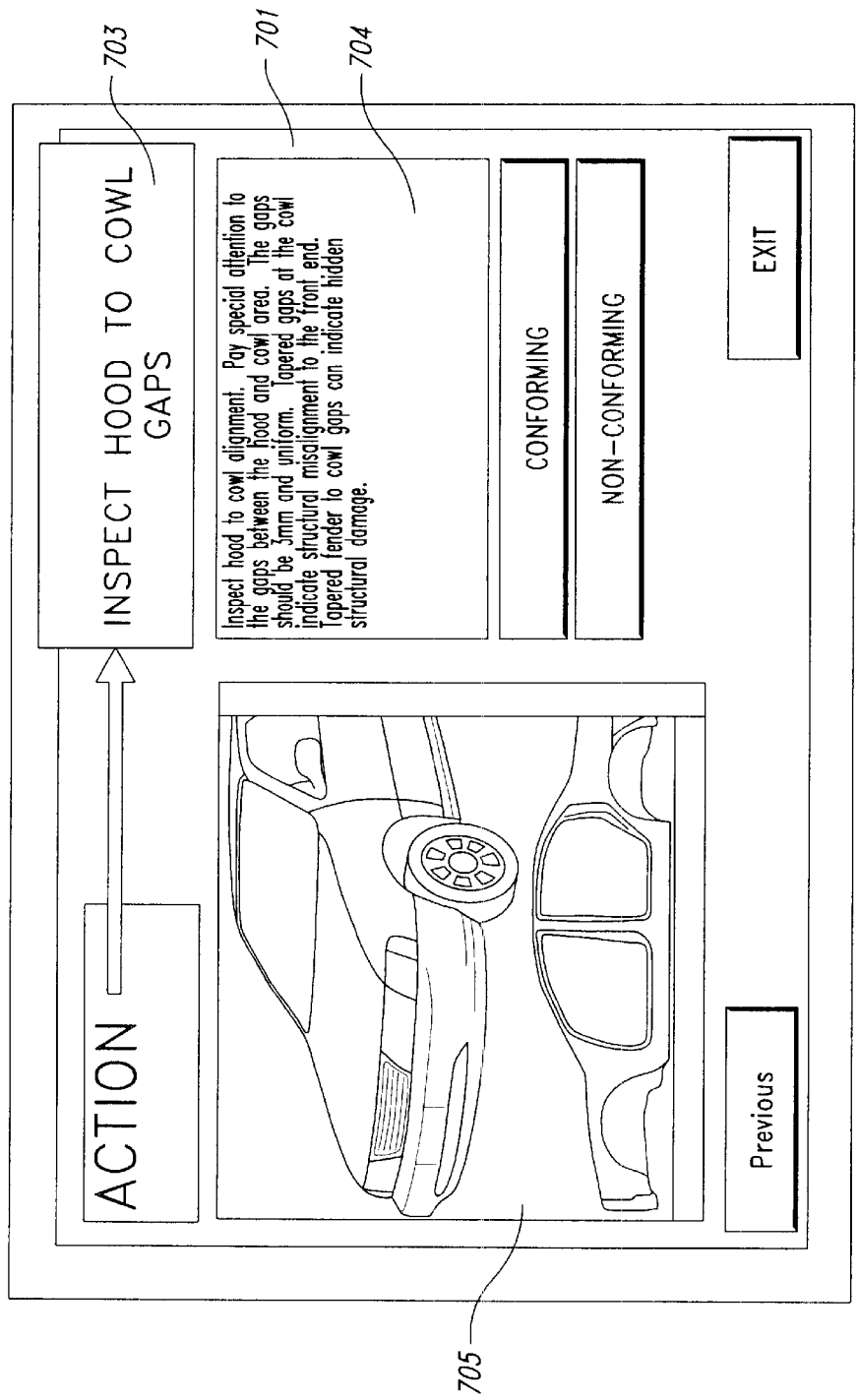
FIG. 7 is an example display screen generated and presented by the inspection facilitator to direct an inspection of hood to cowl gaps.

FIG. 7 is an example display screen generated and presented by the inspection facilitator to direct an inspection of hood to cowl gaps. This display screen is presented as part of the Stage II inspection process when a front end misalignment has been indicated after inspecting the underbody of the vehicle. The task identification area 703 indicates that the areas to be inspected are the gaps between the hood and the cowl (the area between the windshield and the hood). Instruction display area 704 displays specific instructions about inspecting hood alignment and indicates what abnormalities the technician should be looking for. The graphics area 702 displays the portion of the vehicle where the gaps between the hood and the cowl can be found. In addition, display screen 701 includes a Conforming pushbutton 709 and a Nonconforming pushbutton 710, which are processed as described above with reference to FIG. 5.

At this point in the example sequence, the inspection facilitator has received indications of nonconformities with respect to both the hood to fender gaps and the hood to cowl gaps. As a result, the inspection facilitator recognizes that there is probably damage to the frame rails and inner structure. Accordingly, the inspection facilitator determines that it will guide an inspection to detect frame work, use of anchoring systems, and welding.

Figure 8:
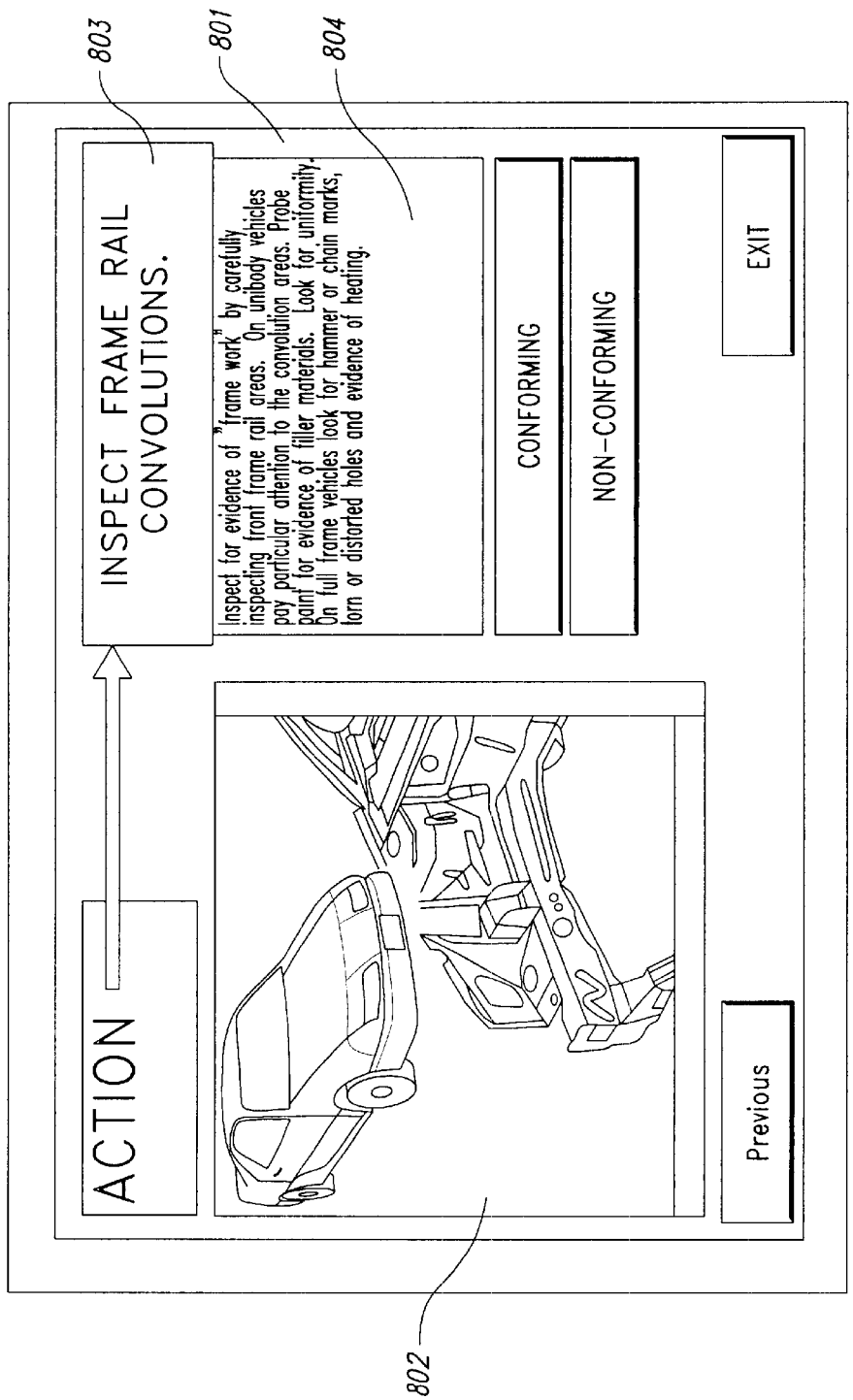
FIG. 8 is an example display screen generated and presented by the inspection facilitator to direct an inspection of frame rail convolution areas.
Figure 9:
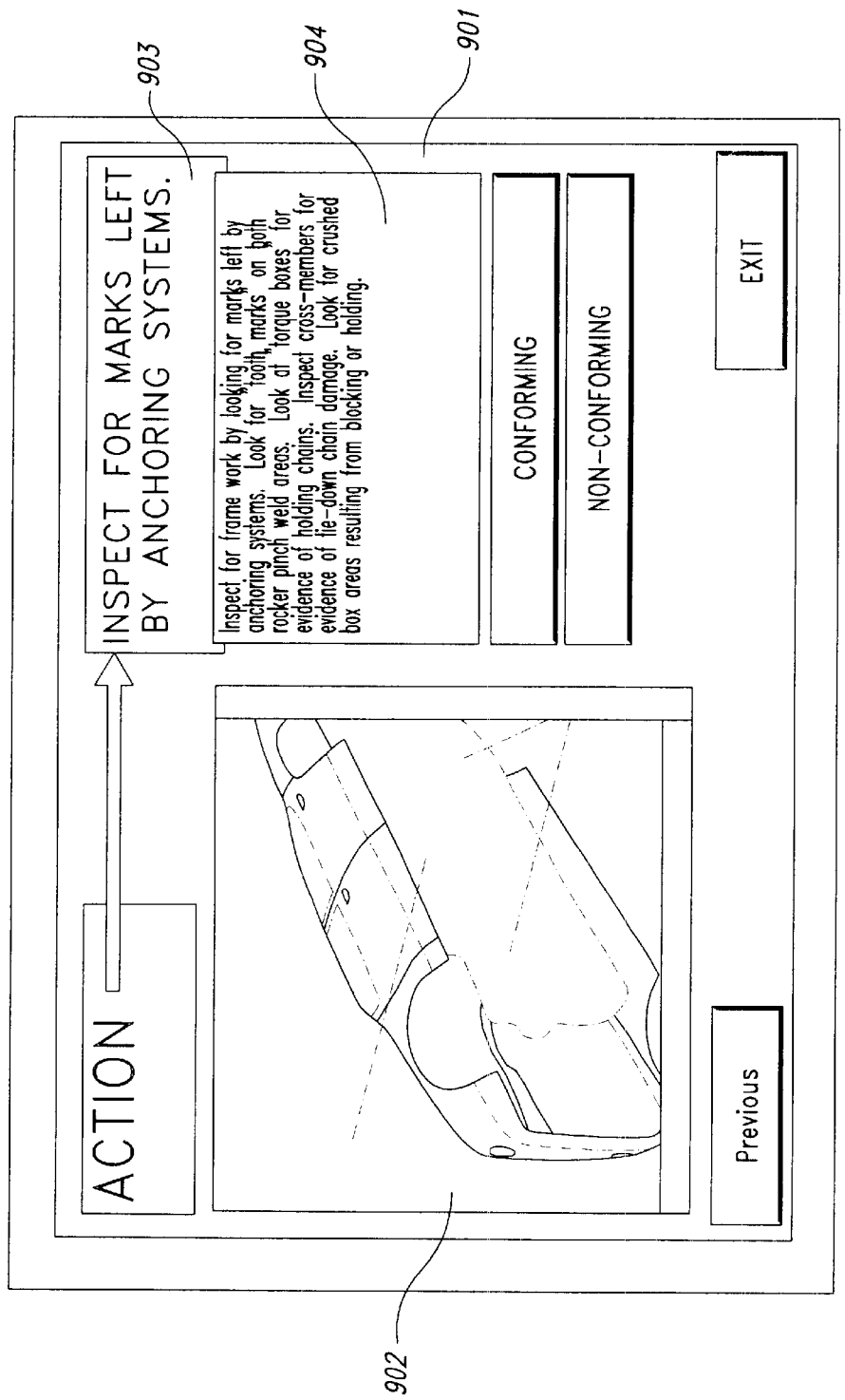
FIG. 9 is an example display screen generated and presented by the inspection facilitator to direct an inspection for marks left by anchoring systems.
Figure 10:
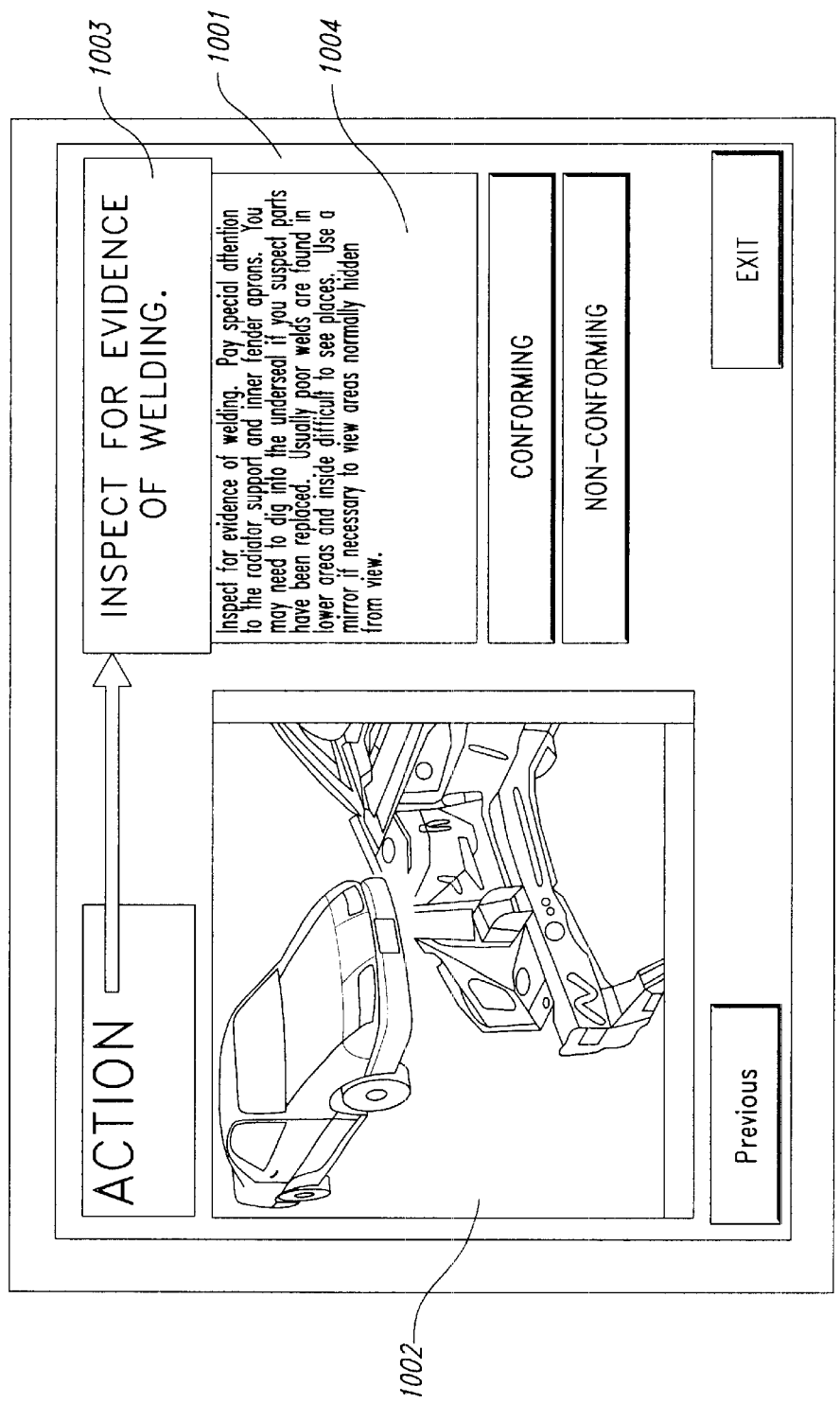
FIG. 10 is an example display screen generated and presented by the inspection facilitator to direct an inspection for evidence of welding.
Figure 11:
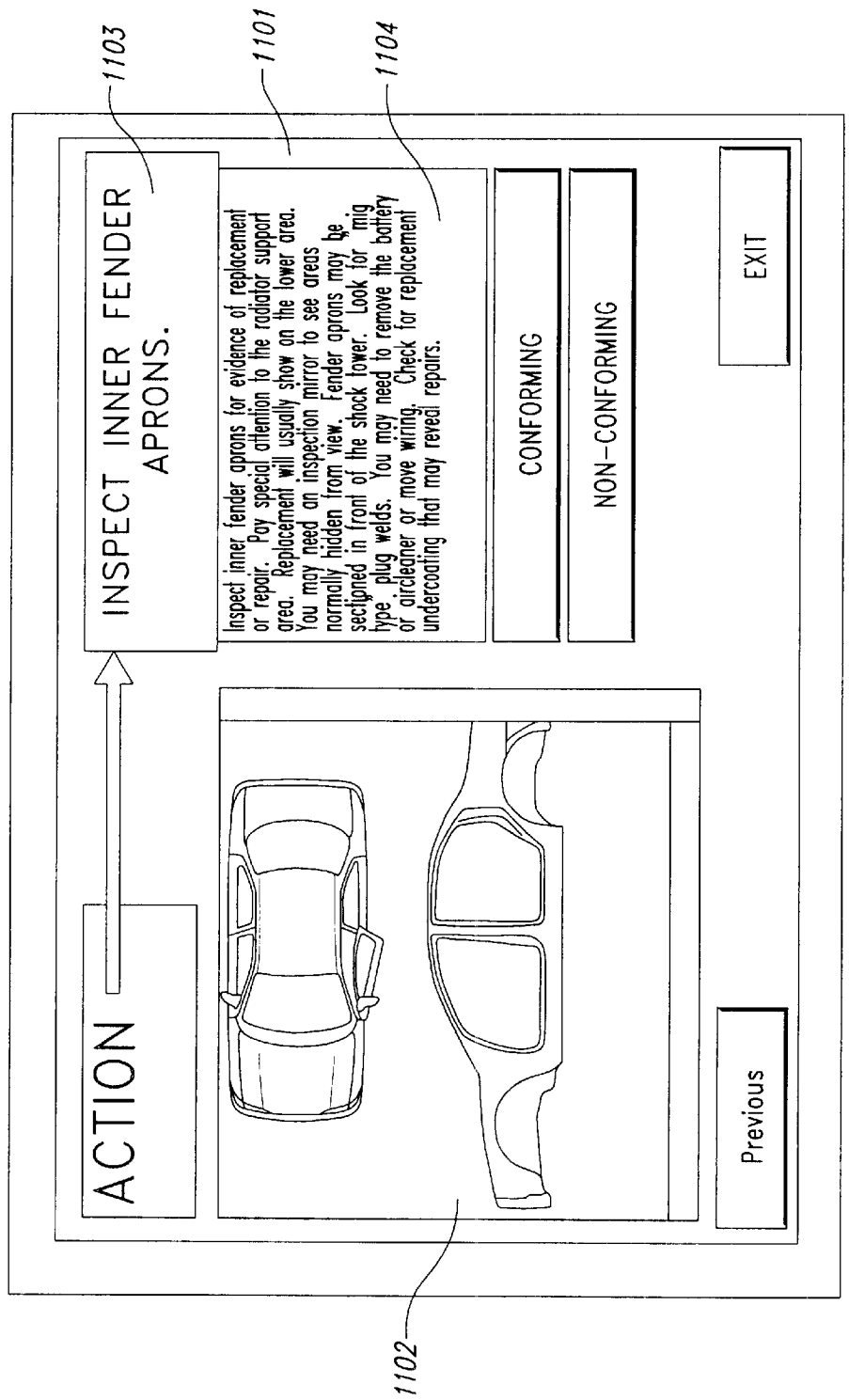
FIG. 11 is an example display screen generated and presented by the inspection facilitator to direct an inspection of the inner fender aprons for evidence of replacement or repair.

FIG. 8 is an example display screen generated and presented by the inspection facilitator to direct an inspection of frame rail convolution areas. The frame rail inspection and the other inspection tasks indicated by FIGS. 9–11 are part of the Stage III inspection process performed when a hood to fender gaps inspection and a hood to cowl gaps inspection both indicate that nonconformities have been found. Nonconformities in these areas are typically indicative of camouflaged damage or substandard repair. The components of the display screen shown in FIG. 8 operate analogously to those of FIGS. 5 and 7.

Similarly, FIGS. 9–11 are Stage III inspection tasks directed by the inspection facilitator when nonconformities are found as a result of the hood to cowl gaps and hood to fender gaps inspections. FIG. 9 is an example display screen generated and presented by the inspection facilitator to direct an inspection for marks left by anchoring systems. FIG. 10 is an example display screen generated and presented by the inspection facilitator to direct an inspection for evidence of welding. FIG. 11 is an example display screen generated and presented by the inspection facilitator to direct an inspection of the inner fender aprons for evidence of replacement or repair.

Once the inspection facilitator has completed directing all three stages of the inspection, the facilitator determines an indication of the overall condition of the vehicle and generates reports as requested. Because, in this example, extensive evidence of damage and repair has been found, the indication of overall condition indicates that serious defects are present.

Figure 12:
FIG. 12 is an example display screen of a vehicle's certificate of title modified to show the results of an after-repair inspection performed using the inspection facilitator.

FIG. 12 is an example display screen of a vehicle's certificate of title modified to show the results of an after-repair inspection performed using the inspection facilitator. Fields 1201 and 1201 display an encoded data string generated by the inspection facilitator that lists all of the nonconformities. This encoded data string is described further below with reference to FIG. 15. The string displayed in fields 1201 and 1201 is "AI2000ef. . . . (280,000)," which indicates the presence of serious defects in accordance with the example under discussion. The string is listed in two locations to ensure that the inspection information is not lost upon sale of the vehicle. Other reports can also be generated.

Tables 1–6 provide example lists of the particular inspections that may be directed by the inspection facilitator in Stages II and III in response to indicia of nonconformities. One skilled in the art will recognize that other inspections may be directed by the inspection facilitator as additional expertise is programmed into the system. The inspection items on these lists are not intended to be exhaustive or to indicate areas that must be inspected. Rather, they are examples of inspection areas that may be determined by the inspection facilitator in response to certain nonconformities being indicated by the technician or by a connected apparatus.

TABLE 1

Stage II - Front Body Section

| | |
|---|---|
| 1a. | Inspect paint for nonconformities. |
| | a. color mismatch |
| | b. dirt |
| | c. orange peel |
| | d. runs or sags |
| | f. overspray |
| | g. low gloss |
| | h. chipping |
| | i. delamination |
| | j. buffer swirls |
| | k. sand scratches |
| 2a. | Inspect hood to fender gaps. |
| 3a. | Inspect hood to cowl gap. |
| 4a. | Inspect lamp and trim alignment to sheet metal. |
| 5a. | Inspect bumper alignment to sheet metal. |
| 6a. | Inspect fender to door alignment. |
| 7a. | Inspect windshield trim or gasket. |
| 8a. | Inspect paint cut-in on fenders and hood. |
| 9a. | Check under hood labels. |
| 10a. | Check moldings and trim. |
| 11a. | Visually inspect the front suspensions for misalignment. |
| 12a. | Visually inspect the front wheels for alignment. |
| 13a. | Inspect front tires for abnormal wear. |

Table 1 is an example list of areas to be inspected during a Stage II inspection of the front section of the vehicle's outerbody. The numeric keys (e.g., "1a" and "2a") can be used to code the inspection data in the databases. Other encodings of inspection data would be equally operable. The encodings used are described further below with reference to FIG. 15.

TABLE 2

Stage II - Center Body Section

| | |
|---|---|
| 1b. | Inspect paint for nonconformities. |
| | b. color mismatch |
| | b. dirt |
| | c. orange peel |
| | d. runs or sags |
| | f. overspray |
| | g. low gloss |
| | h. chipping |
| | i. delamination |
| | j. buffer swirls |
| | k. sand scratches |
| 2b. | Inspect door to fender gaps. |
| 3b. | Inspect door to roof gaps. |
| 4b. | Inspect door hinge and latch operation. |
| 5b. | Inspect interior trim panels. |
| 6b. | Inspect door to rocker panel alignment. |
| 7b. | Inspect backglass and moldings for evidence of replacement or tampering. |
| 8b. | Inspect paint cut-in on doors and hinge pillars. |
| 9b. | Inspect door labels. |
| 10b. | Inspect moldings and trim. |
| 11b. | Inspect center pillar. |
| 12b. | Verify VIN number attachment. |
| 13b. | Inspect sunroof gaps, fit, and operation. |
| 14b. | Inspect roof for evidence of distortion or repairs. |
| 15b. | Inspect windshield trim or gasket. |

Table 2 is an example list of areas to be inspected during a Stage II inspection of the center section of the vehicle's outerbody.

TABLE 3

Stage II - Rear Body Section

| | |
|---|---|
| 1c. | Inspect paint for nonconformities. |
| | a. color mismatch |
| | b. dirt |
| | c. orange peel |
| | d. runs or sags |
| | f. overspray |
| | g. low gloss |
| | h. chipping |
| | i. delamination |
| | j. buffer swirls |
| | k. sand scratches |
| 2c. | Inspect quarter to door gaps. |
| 3c. | Inspect deck lid to quarter gaps. |
| 4c. | Inspect lamp and trim alignment to sheet metal. |
| 5c. | Inspect bumper alignment to sheet metal. |
| 6c. | Inspect deck lid for signs of replacement or distortion. |
| 7c. | Inspect back light trim or gasket. |
| 8c. | Inspect paint cut-in on quarters and rear body panel. |
| 9c. | Inspect trunk floor. |
| 10c. | Inspect moldings and trim. |
| 11c. | Inspect deck lid weather-strip. |
| 12c. | Inspect deck lid to sail panel. |
| 13c. | Visually inspect the rear wheels for alignment. |
| 14c. | Inspect rear tires for abnormal wear. |

Table 3 is an example list of areas to be inspected during a Stage II inspection of the rear section of the vehicle's outerbody.

TABLE 4

Stage III - Front Body Section

| | |
|---|---|
| 1a. | Inspect for paint mismatch, overspray, undercoating, oil or grease that could be used to camouflage repaired areas. |
| 2a. | Inspect for evidence of "frame work" by carefully inspecting frame rail convolutions. |
| 3a. | Inspect for "frame work" by looking for marks left by anchoring systems. |
| 4a. | Inspect for replaced parts by inspecting bolt heads for evidence of removal. |
| 5a. | Inspect under-hood warning labels for evidence of tampering, replacement, or failure to replace. |
| 6a. | Inspect for evidence of welding. |
| 7a. | Inspect for evidence of heating. |
| 8a. | Inspect for replaced or tampered suspension parts. |

TABLE 4-continued

Stage III - Front Body Section

| | |
|---|---|
| 9a. | Inspect for tire wear, or recently replaced front tires. |
| 10a. | Inspect inner fender aprons for evidence of replacement or straightening. |
| 11a. | Inspect to verify that road dirt matches under entire vehicle. |
| 12a. | Inspect front bumper for replacement. |
| 13a. | Inspect headlight mount brackets for evidence of repair or removal. |
| 14a. | Inspect hood latch for evidence of replacement or removal. |
| 15a. | Inspect hood hinges for evidence of replacement or removal. |
| 16a. | Inspect grill and mount points for evidence of replacement or removal. |
| 17a. | Inspect radiator for evidence of replacement, removal, or scarring. |
| 18a. | Inspect fan shroud for evidence of replacement, removal, or scarring. |
| 19a. | Inspect fan for evidence of replacement, removal, or scarring. |
| 20a. | Inspect air conditioner condenser for evidence of replacement, removal, or scarring. |
| 21a. | Inspect air bag for evidence of replacement or removal. |
| 22a. | Visually inspect the front wheels for alignment. |
| 23a. | Inspect door gaps for alignment. |
| 24a. | Inspect roof for evidence of distortion or repairs. |
| 25a. | Inspect for the use of plastic body filler. |

Table 4 is an example list of areas to be inspected during a Stage III inspection of the front section of the vehicle's outerbody.

TABLE 5

Stage III - Center Body Section

| | |
|---|---|
| 1b. | Inspect for paint mismatch, overspray, undercoating, oil or grease that could be used to camouflage repaired areas. |
| 2b. | Inspect for evidence of "frame work" by carefully inspecting frame rail torque boxes. |
| 3b. | Inspect for "frame work" by looking for marks left by anchoring systems. |
| 4b. | Inspect for replaced parts by inspecting bolt heads for evidence of removal. |
| 5b. | Measure door hinge pillars. |
| 6b. | Inspect for evidence of welding. |
| 7b. | Inspect for evidence of heating. |
| 8b. | Inspect cowl area for evidence of work. |
| 9b. | Inspect door gaps for alignment. |
| 10b. | Inspect roof for evidence of distortion or repairs. |
| 11b. | Inspect glass gaskets for evidence of overspray. |
| 12b. | Inspect rocker panels for evidence of replacement or repair. |
| 13b. | Inspect doors for evidence of replacement or removal. |
| 14b. | Inspect underside of doors for paint deformities. |
| 15b. | Inspect door hinge bolts for evidence of tampering. |
| 16b. | Inspect door latch and striker for evidence of replacement or removal. |
| 17b. | Inspect upholstery for evidence of replacement or removal. |
| 18b. | Inspect seat belt mount area for evidence of replacement or removal. |
| 19b. | Inspect for the use of plastic body filler. |

Table 5 is an example list of areas to be inspected during a Stage III inspection of the center section of the vehicle's outerbody.

TABLE 6

Stage III - Rear Body Section

| | |
|---|---|
| 1c. | Inspect for paint mismatch, overspray, undercoating, oil or grease that could be used to camouflage repaired areas. |
| 2c. | Inspect for evidence of "frame work" by carefully inspecting frame rail torque boxes. |
| 3c. | Inspect for "frame work" by looking for marks left by anchoring systems. |
| 4c. | Inspect for replaced parts by inspecting bolt heads for evidence of removal. |
| 5c. | Inspect trunk floor for evidence of replacement or repair. |

TABLE 6-continued

Stage III - Rear Body Section

| | |
|---|---|
| 6c. | Inspect for evidence of welding. |
| 7c. | Inspect for evidence of heating. |
| 8c. | Inspect quarter panels for evidence of replacement or repair. |
| 9c. | Inspect rear body panel for evidence of replacement or repair. |
| 10c. | Inspect deck lid for evidence of replacement or repair. |
| 11c. | Inspect the tail-lights for evidence of replacement or repair. |
| 12c. | Inspect deck lid weather-strip for tampering and overspray. |
| 13c. | Inspect the tail pipe for evidence of damage, replacement or repair. |
| 14c. | Visually inspect the rear wheels for alignment. |
| 15c. | Inspect door gaps for alignment. |
| 16c. | Inspect roof for evidence of distortion or repairs. |
| 17c. | Inspect for the use of plastic body filler. |

Table 6 is an example list of areas to be inspected during a Stage III inspection of the rear section of the vehicle's outerbody.

Figure 13:
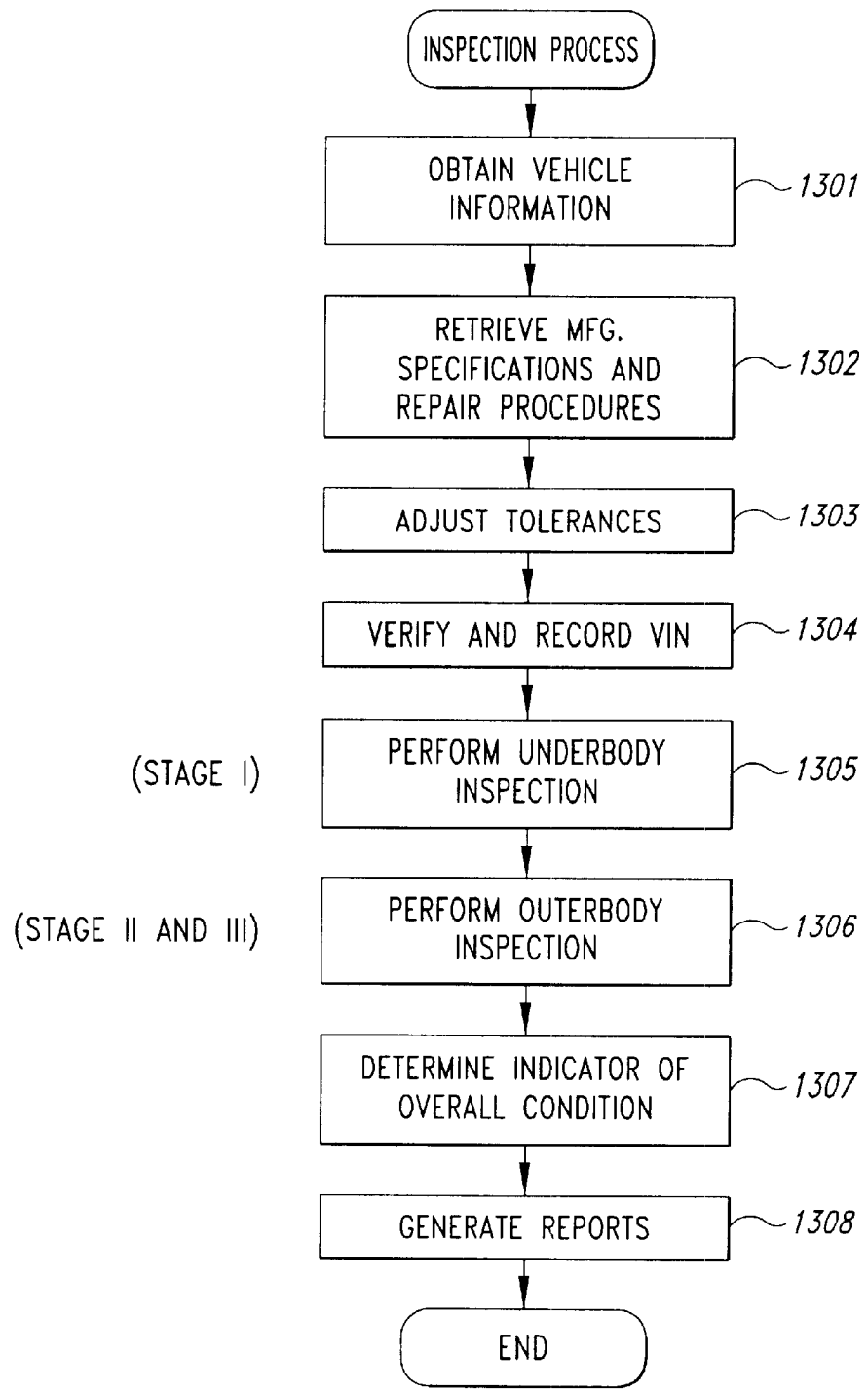
FIG. 13 is an overview flow diagram of the inspection process as implemented by the inspection facilitator.

FIG. 13 is an overview flow diagram of the inspection process as implemented by the inspection facilitator. Although the steps are shown in an example order, one skilled in the art will recognize that other orders of these steps are operable with embodiments of the present invention. These steps perform the three stages of the inspection process described above. Specifically, in step 1301, the inspection facilitator obtains vehicle information from the technician, such as the vehicle identification number ("VIN"). In step 1302, the inspection facilitator retrieves the appropriate OEM specifications and repair specifications from the data repositories and sets tolerances in order to direct the flow of the inspection. In step 1303, the inspection facilitator adjusts the tolerances for the characteristics of the particular vehicle, such as age and prior use. One skilled in the art will recognize that these adjustments may not be performed at a single time or at this step, but may instead be performed throughout the inspection process. In step 1304, the inspection facilitator verifies the correctness of the VIN to determine whether the vehicle is stolen and records the VIN for later use in detecting stolen vehicle parts.

One method for performing VIN verification is to compare the VIN numbers placed in several locations on the vehicle for consistency and to trace any determined inconsistencies to an on-line database. Specifically, the VIN for a vehicle is placed in multiple locations on the vehicle as required by the Federal Anti-Car Theft Act of 1992. Indicators of these locations are stored in the inspection engine and retrieved as needed. (These locations are typically only provided to law enforcement agencies, but could be appropriately licensed.) The VINs at all locations are retrieved and compared with each other to determine inconsistencies, such as VINs that are not identical or VINs whose component fields do not correlate to the attributes of the vehicle. For example, a VIN that indicates a 4-door sedan would be incorrect for a 2-door sports coupe. Suspect VINs are then processed through a national database, such as the National Insurance Crime Bureau database, to determine if the suspect VIN matches a suspect/stolen vehicle or parts from a suspect/stolen vehicle. Other similar techniques for verifying VINs would be operable with embodiments of the present invention.

In step 1305, the inspection facilitator directs the technician to perform an underbody inspection (e.g., Stage I alignment measurements) to grossly determine the presence of damage or repair. The inspection facilitator typically provides graphical representations of the portions of the vehicle to be measured and provides instructions for obtaining the measurements. In step 1306, the inspection facilitator directs the technician to perform an outerbody inspection to locate areas of repair or camouflaged damage and to assess the quality of such repairs and the severity of any damage (step 1306 corresponds to Stages II and III of the overall inspection process described above).

The specific areas to be inspected in step 1306 are dynamically determined by the inspection facilitator based upon the nonconformity results reported thus far by the technician, the manufacturer's specifications for that specific vehicle, and an assessment of proper repair procedures. As described above, an exemplary embodiment of the inspection facilitator is implemented using an expert system. The expert system encodes the expertise of a trained collision technician expert to direct a uniform inspection procedure that can be used by other technicians. The expert system is programmed to dynamically determine the next area to inspect by comparing the inspection data input to the rules and facts encoded in the expert system and the retrieved OEM specifications and repair procedures.

In step 1307, the inspection facilitator determines an indication of the overall condition of the vehicle based upon the severity of reported nonconformities as compared to industry standard repair procedures. This step may be performed by the inspection facilitator system automatically. Alternatively, a technician may input the technician's determination of the overall condition based upon the nonconformities identified thus far. One mechanism for determining an indication of the overall condition involves numerically weighting the nonconformities indicated by the technician and mathematically combining these weightings to assess a numeric value (a rating) for the overall condition. Depending upon the range that the overall rating falls within, the rating is used to indicate one of the following conditions: (1) no serious damage has occurred to the vehicle; (2) damage has occurred, but has been repaired to industry standards; (3) damage has occurred and has not been repaired to industry standards; and (4) damage has occurred and the vehicle is unsafe.

Once the overall condition is determined, in step 1308 the inspection facilitator produces reports on the condition of the vehicle, which typically include a statement of the overall condition and indications of nonconforming areas, and may include specific nonconforming inspection data values. For example, the inspection facilitator may issue a certificate of structural integrity.

In exemplary embodiments, the inspection facilitator is implemented on a computer system comprising a central processing unit, a display, a memory, and other input/output devices. Exemplary embodiments are designed to operate stand-alone or in a globally networked environment, such as a computer system that is connected to the Internet. Exemplary embodiments are also designed to operate in an environment that supports a graphical user interface, such as the graphical user interface support provided by various versions of the WINDOWS operating system. One skilled in the art will recognize that embodiments of the inspection facilitator can be practiced in other environments that support a graphical user interface. Also, one skilled in the art will recognize that the computer system may be provided as a portable apparatus and may be directly connected to apparatuses designed to diagnose or measure vehicle data.

Figure 14:
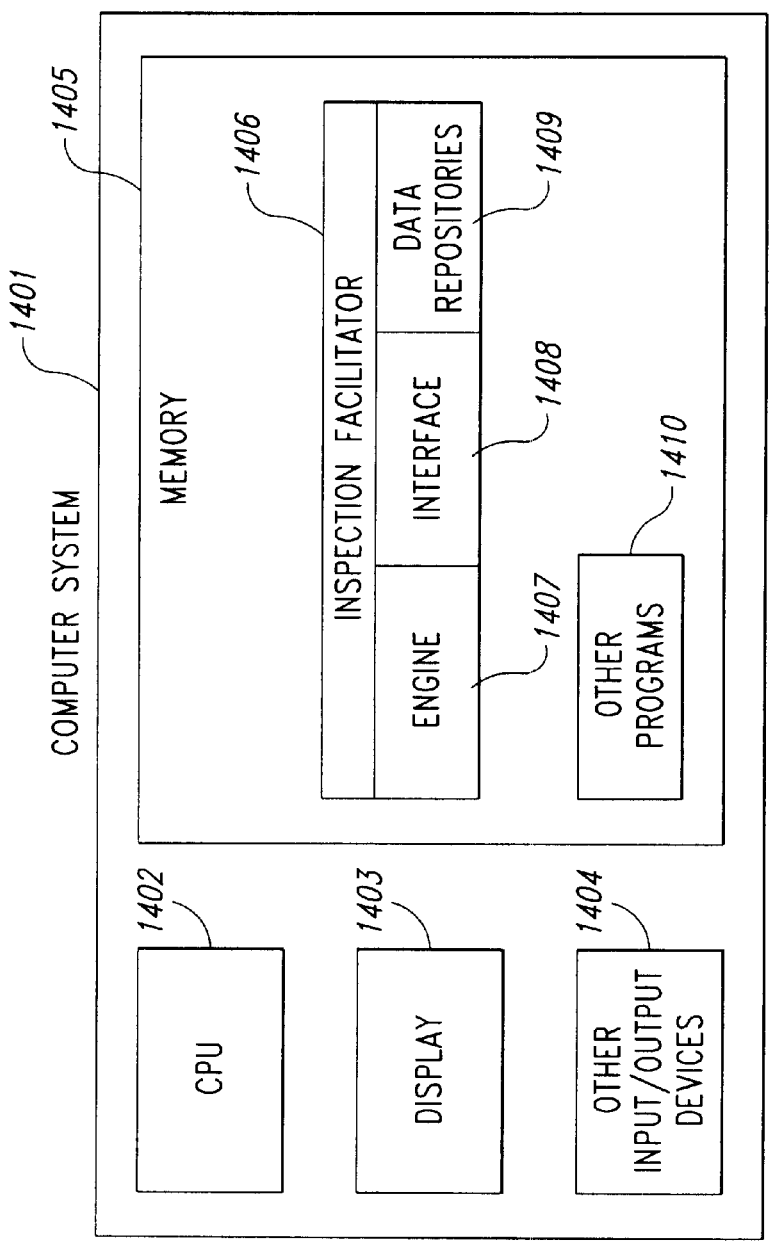
FIG. 14 is a block diagram of a general purpose computer system for practicing embodiments of the inspection facilitator.

FIG. 14 is a block diagram of a general purpose computer system for practicing embodiments of the inspection facilitator. The computer system 1401 contains a central processing unit (CPU) 1402, a display 1403, a computer member (memory) 1405, or other computer-readable memory medium, and other input/output devices 1404. The components of the inspection facilitator 1406 typically reside in the memory 1405 and execute on the CPU 1402. As described in FIG. 1, the inspection facilitator 1406 comprises various components, including an inspection engine 1407, an inspection user interface 1408, and one or more data repositories 1409. These components are shown residing in the memory 1405. Other programs 1410 also reside in the memory 1405.

One skilled in the art will recognize that exemplary inspection facilitators can be implemented as one or more code modules and may be implemented in a distributed environment where the various programs shown as currently residing in the memory 1405 are instead distributed among several computer systems. For example, the data repository 1409, which contains the OEM and repair specifications may reside on a different computer system than the computer system on which the inspection engine 1407 and the inspection user interface 1408 reside. In addition, the inspection data (e.g., inspection data 104 in FIG. 1) may be stored on a remote computer system and may be accessible by authorized third parties. Further, any well-known mechanism for implementing a data repository may be used to implement the data repository 1409, including well-known database techniques.

In an exemplary embodiment, the inspection facilitator is implemented using expert system technology. As described earlier, an expert system is a computer program that makes decisions or solves problems using knowledge and analytical rules defined by experts in a particular field. An expert system is typically comprised of a knowledge base and an inference engine. The knowledge base provides specific facts and rules about the field, and the inference engine provides the reasoning ability that enables the expert system to form conclusions. In some implementations, the knowledge base is considered part of the inference engine, once the inference engine is coded for a particular knowledge base. Thus, for the purposes of this specification, the term "inference engine" will reference to either an inference engine alone or to a combined inference engine and knowledge base. Expert systems also typically provide a user interface to obtain input data. The inference engine compares the input data against the facts and rules to derive conclusions, upon which the expert system acts.

One example expert system development environment, which can be used to implement the inspection facilitator expert system is provided by an application program called Visual Expert, Version 3.0. Visual Expert is a graphical-based development environment for creating expert system applications. Visual Expert provides a myriad of tools for developing a full-fledged expert system that includes an inference engine tailored to a specific knowledge base. A developer using Visual Expert provides the facts and heuristics (the knowledge base) used to control the flow of the expert system application that is being produced (the target expert system). In addition, the developer builds a user interface for the target expert system using graphical-based tools provided by Visual Expert. Once the knowledge base and user interface have been specified, Visual Expert generates an appropriate inference engine and produces the target expert system application.

Accordingly, Visual Expert can be used to create the inspection engine and the inspection interface of embodiments of the present invention. When implemented using Visual Expert, the inspection engine and inspection interface are combined into a single computer program. As described above, the inspection engine of the inspection facilitator selects the next inspection task based upon the nonconformities received. Thus, it is the responsibility of the expert system developer to indicate the next processing step for each possible input. In this manner, the inference engine created selects an appropriate inspection task upon receiving input indicating a nonconformity. Further information regarding the Visual Expert development environment and how to use it to create an expert system is provided in SoftSell Technologies, Inc., *Visual Expert, Version* 3.0 *User's Guide* and *Getting Started* manuals, 1994, which are incorporated herein by reference in their entirety.

Figure 15:
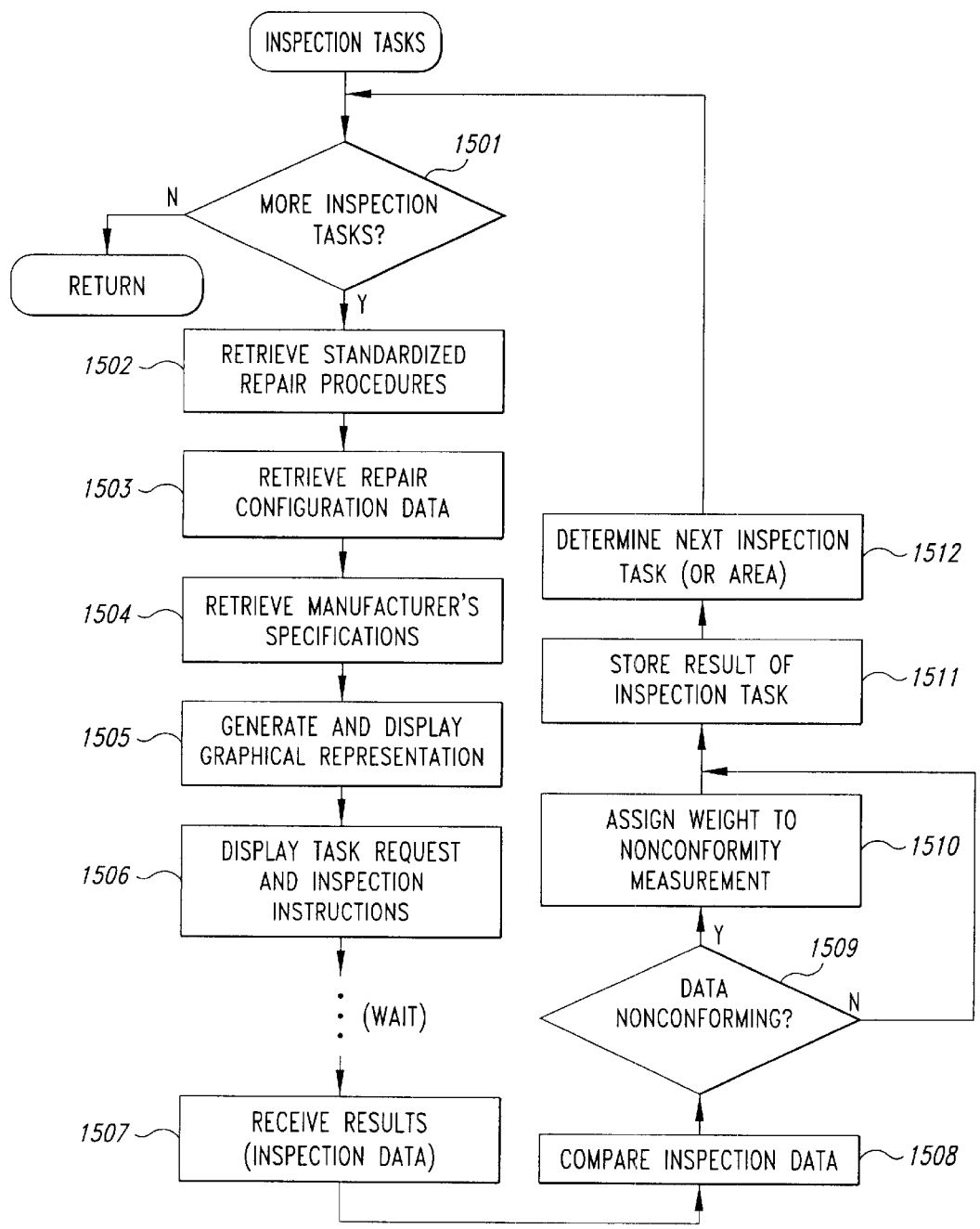
FIG. 15 is a block diagram of the steps performed by the inspection facilitator to direct each inspection task during the inspection process.

FIG. 15 is a block diagram of the steps performed by the inspection facilitator to direct each inspection task during the inspection process. These steps are performed for each inspection task requested by the inspection facilitator and are repeated as many times as necessary to complete Stages II and III of the inspection process. (These steps correspond to each inspection performed in step 1306 of FIG. 13.) In summary, for each inspection task, the inspection facilitator retrieves OEM specification and repair procedure information, displays instructions for the inspection task, processes the results, and determines a next inspection task.

Specifically, in step 1501, the facilitator determines whether a next inspection area or task has been indicated to be inspected and, if so, continues in step 1502, else returns. In step 1502, the inspection facilitator retrieves the standard repair procedures applicable to the next inspection area or task. In step 1503, the inspection facilitator retrieves repair configuration data applicable to the identified vehicle (for example, where a particular part or area to be inspected is located on the vehicle). In step 1504, the inspection facilitator retrieves the OEM specifications for a particular part to be inspected. From the specifications, configuration data, and repair procedures retrieved in steps 1502–1504, the inspection facilitator in step 1505 generates and displays a graphical representation of the vehicle, which identifies the next area (or part) to be inspected. In order to facilitate efficient generation and display of the graphical representation, one embodiment of the inspection facilitator stores several representations of general car configurations that can simply be retrieved and displayed on a display screen. Other embodiments that use more complicated graphics engines are also operable with the techniques of the present invention. In step 1506, the inspection facilitator displays a request to perform an inspection of a particular area or part and provides instructions (e.g., to the technician) on how to perform the inspection task. At this point, the inspection facilitator waits until it receives input data from the technician (or other entity performing the inspection). In step 1507, the inspection facilitator receives the results of the requested inspection as inspection data. In step 1508, the inspection facilitator compares the received inspection data with the retrieved standardized repair procedures (and, when relevant, the OEM specifications for the inspected part) to determine whether the received inspection data is within OEM tolerances and whether the requested area or part has been repaired properly. In step 1509, the inspection facilitator determines whether the comparison indicates any nonconformities and, if so, continues in step 1510, else continues in step 1511. In step 1510, the inspection facilitator assigns a numeric weight to the determined nonconformity. The numeric weight is based upon the severity of the nonconformity (the extent the part is out of tolerance with OEM specifications); the location of the nonconformity (certain parts are more important to the operation and safety of the car than others); and deviations from standardized repair procedures. One skilled in the art will recognize that other criteria may be used to assign the weight and that other weighting schemes may be used. In step 1511, the inspection facilitator stores the results of the completed inspection task. The results may be stored locally or may be uploaded to a remote computer database used to provide third party access to inspection data. In step 1512, the inspection facilitator determines the next inspection area or task based upon the nonconformities observed thus far and the flow rules programmed into the inference engine. If a next inspection area or task is identified, then the steps of FIG. 15 are again executed; otherwise the inspection facilitator determines an indication of the overall condition as described with reference to step 1307 of FIG. 13.

In an exemplary embodiment, the inspection facilitator encapsulates the results of each task of the inspection process by encoding them in some manner. For example, a data string may be used to encode, for each nonconformity indicated, the area of nonconformity and the numerical weight assigned by the inspection facilitator. The encoded results are preferably compact enough to be printed on the title document of each vehicle or to be mounted on the vehicle similar to a serial number. In addition, during the report generation process (e.g., step 1308 in FIG. 13), the inspection facilitator can decode the encoded results to display detailed descriptions of the nonconformities found and interpretations of the various numeric weights assigned by the inspection facilitator.

For example, the inspection facilitator may encode a portion of a result data string to reflect a nonconformity in the "hood to fender gaps" as follows:

... efAII2a250... The substring "AII" indicates a Stage II inspection of the front section of the outerbody (A=front; B=Center, C=rear). The substring "2a" indicates that a "hood to fender gaps" inspection was performed (see Table 1). The substring "ef" indicates that both the left and right hood to fender gaps are nonconforming (the e and the f indicate left and right, respectively). The substring "250" indicates a nonconformity severity measurement. In this example, the nonconformity severity measurement is computed by the inspection facilitator from a technician-supplied rating of the severity of the defect multiplied by a weighting multiplier. According to one embodiment, defects are rated on a 1 to 5 scale by the technician, with 1 being minor and 5 being severe. In addition, weighting multipliers are determined on the following scale:

cosmetic defects are multiplied by 10;

poor quality repairs are multiplied by 50; and serious safety defects are multiplied by 100.

One skilled in the art will recognize that these particular defect rating and weighting multiplier schemes are examples only and any weighting or defect rating scheme may be used to generate a nonconformity severity measurement. In addition, one skilled in the art will recognize that weighting systems that represent weightings in ways other than numerical weightings, for example, graphical icons, may also be used. Also, one skilled in the art will recognize that any type of encoding of the inspection data is operable with embodiments of the present invention. Using these example encodings, defect ratings, and weighting multipliers, a nonconformity severity measurement of "250" for this particular area (hood to fender gaps) indicates that the defect was considered a "5" and was multiplied by a weighting multiplier of 50.

In addition to assessing a numeric weight for each inspection task, after the determined inspection tasks have been directed and performed, the inspection facilitator determines an indication of the overall condition for the vehicle as discussed with reference to FIG. 13. In an exemplary embodiment, the inspection facilitator combines the nonconformity severity measurements computed for each inspection task having nonconformities and modifies the combined result using different rating qualifiers to determine an overall rating of damage and/or improper repair (i.e., a defect rating). For example, rating qualifiers based on the year of the vehicle model, the current value of the vehicle, and the mileage of the vehicle may be used to tailor the overall defect rating to the particular vehicle being inspected.

One method for computing the overall defect rating is to add all of the nonconformity severity measurements to determine a total nonconformity severity measurement and to then multiply the total by the rating qualifiers. For example, the encoded data string, AI2000efAII2a250AII3a150AIII6a150 indicates a total nonconformity severity measurement of 2550 (=2000+250+150+150). The total is then multiplied by the rating qualifiers for age, value, and mileage to obtain an overall defect rating.

Table 7 lists example rating qualifiers that are used by the inspection facilitator to adjust a total nonconformity severity measurement to obtain an overall defect rating for a vehicle.

TABLE 7

Model year qualifier:

Model years current to 5 years old multiplied by 100
Model years 5 to 10 years old multiplied by 50
Model years 10 to 20 years old multiplied by 10
Value qualifier:

$30,000.00 to $20,000.00 multiplied by 100
$20,000.00 to $10,000.00 multiplied by 50
$10,000.00 to $5,000.00 multiplied by 25
$5,000.00 to $500.00 multiplied by 10
Mileage qualifier:

0 to 10,000 miles multiplied by 100
10,000 to 20,000 miles multiplied by 75
20,000 to 50,000 miles multiplied by 50
30,000 to 75,000 miles multiplied by 30
75,000 to 100,000 miles multiplied by 20
100,000 to 150,000 miles multiplied by 10
150,000 to 200,000 miles multiplied by 0

As shown in Table 7, the overall defect rating for a vehicle is qualified by the age of the vehicle as measured in ranges, the current value of the car (e.g., as determined by bluebook value), and the use of the car (e.g., as determined by the mileage driven). One skilled in the art will recognize that other rating qualifiers may be used and that other techniques for calculating or determining an overall defect rating are operable with embodiments of the present invention. For example, a system that does not weight individual nonconformities and instead defers to a technician's determination of an overall defect rating (or of individual defect ratings) can also be used.

Once the overall defect rating has been determined, an explanation of the determined overall condition may be reported in a certificate of structural integrity. For example, according to one scheme, ratings in the range of less than 1,000 are reported as cosmetic blemishes. Ratings between 1,000–20,000 are reported in a manner that indicates that minor damage is present or that poor quality repairs have been made, which may or may not be reflected in the value of the vehicle. Ratings above 20,000 are reported in such a way as to suggest that a potential buyer may want to inspect the noted areas more carefully before purchasing the vehicle. One skilled in the art will recognize that any rating scheme that takes into account the above-mentioned factors or similar factors can be utilized.

Other reports can also be generated by the inspection facilitator. For example, a uniform report specific to state requirements (e.g., requirements for content and formatting) may be produced. In addition, by changing the mappings between encoded inspection data and desired output strings, any type of customized explanation, including foreign language explanations, may be produced. Well-known mechanisms for achieving data conversion may be incorporated, such as storing a data file in a known location, which specifies a translation of each encoded portion and a format for the translation.

In addition, reports tailored to specific uses can be generated by the inspection facilitator. For example, the inspection facilitator can produce customized reports that report nonconformities in certain areas and not others. For example, the facilitator can produce a report for use in litigation, which reports a likely site or cause of a failure in a certain vehicle part, or other factors related to liability in personal injury claims. As another example, the facilitator can produce a report for insurance adjusters, which reports the extent and adequacy of past repair on vehicles of a similar type and the extent and cost of current repair. Similarly, the inspection facilitator can generate reports for government regulatory agencies, which report data regarding vehicles that have been found with substandard repairs or stolen parts. One skilled in the art will recognize that the inspection facilitator may be configured to provide any type of customized report based upon the inspection data. On the other hand, the inspection facilitator also may be configured to produce a single type of report to achieve a larger degree of uniformity. Any combination in between can also be generated.

Guiding a Repair or Repair Estimate Process

As mentioned earlier, the inspection facilitator, with its methods, systems, example implementations and techniques described also can be used to estimate needed repairs after a collision or to guide an actual repair process. In this scenario, the underbody and outerbody inspection processes are used to identify direct and indirect damage and to indicate appropriate repairs. The inspection facilitator operates in a similar fashion to its operation for guiding a general inspection process.

When a vehicle is involved in a collision, the design of the vehicle and the force and location of impact, generally speaking, determines the damage. "Energy management" is the process by which the vehicle absorbs energy in the event of a collision. Contemporary vehicles, which typically utilize light, single body frame construction, are designed to minimize the collapse and deformation of areas needed to protect occupants. For example, door panels are typically reinforced so they do not collapse. However, the impact force needs somehow to be dissipated. The manner in which the design of the vehicle handles such impact force is known as energy management.

Figure 16:
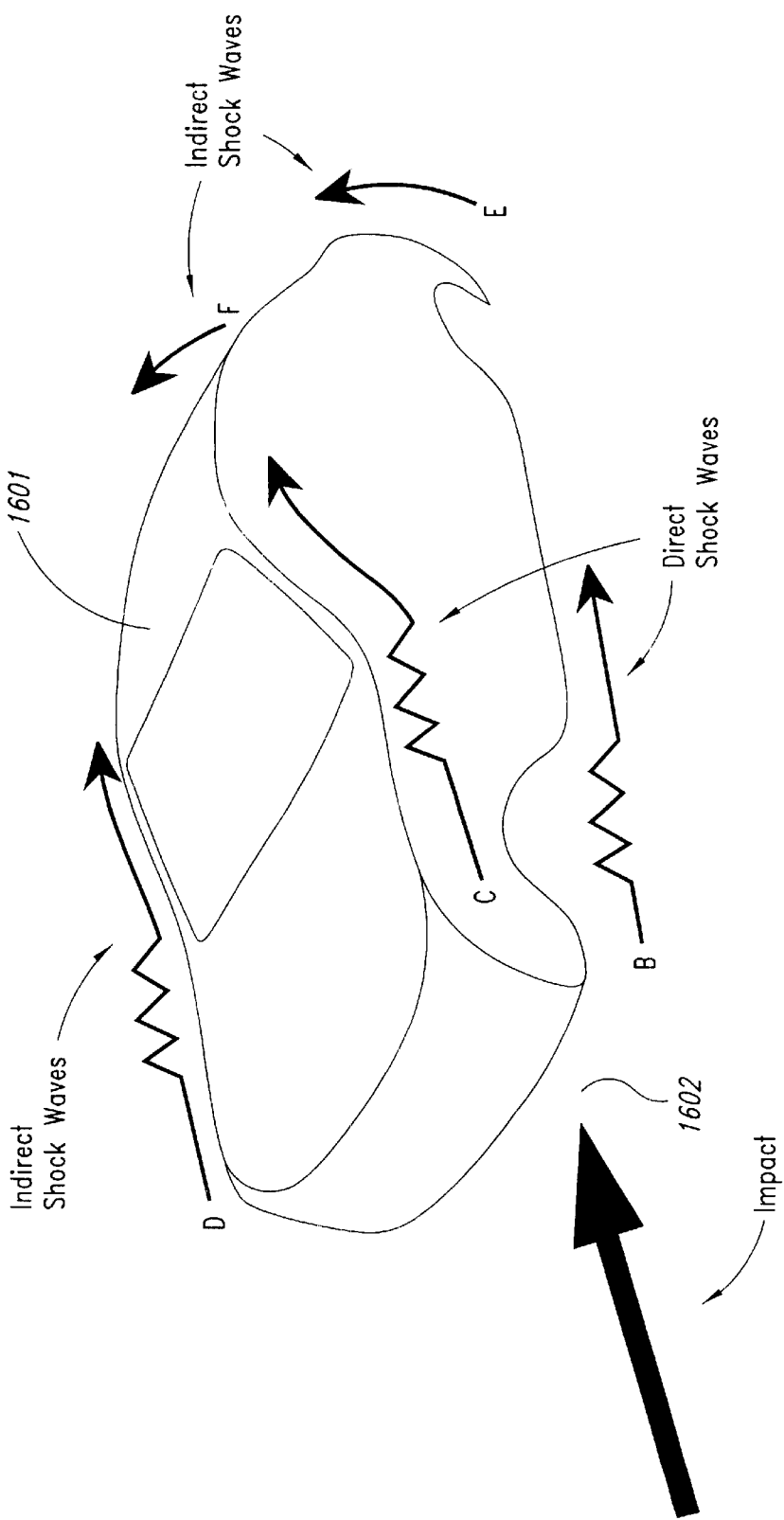
FIG. 16 is a block diagram of example energy management design of shock waves that may occur when a vehicle is involved in a frontal collision.

FIG. 16 is a block diagram of example energy management design of shock waves that may occur when a vehicle is involved in a frontal collision. In FIG. 16, when the vehicle 1601 is hit at impact point 1602, then shock waves B, C, D, E and F may travel throughout the body of the vehicle in response. Direct damage is the damage that occurs at the point of impact 1602. Indirect damage is the damage that results from shock waves B, C, D, E, and F traveling through the body of the vehicle as a result of the energy management design of the vehicle. The size and location of the shock waves are dependent upon the particular energy management design of the vehicle.

Figure 17:
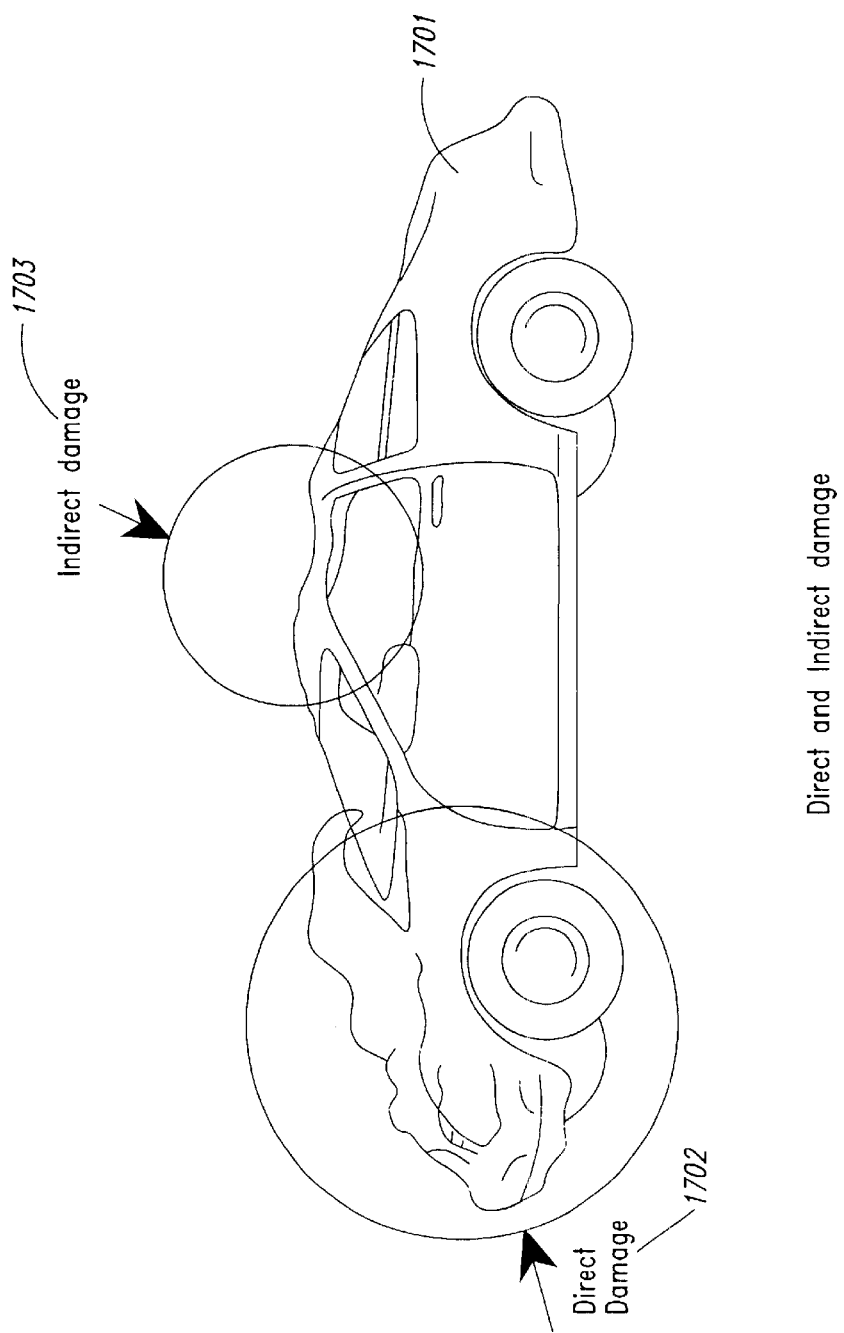
FIG. 17 is a block diagram of an example vehicle that has sustained direct and indirect damage.

FIG. 17 is a block diagram of an example vehicle that has sustained direct and indirect damage. Damage caused as a result of impact is known as "direct damage." Vehicle 1701 has been hit in the front causing direct damage 1702 to the hood, fenders, and front end of the vehicle. Damage that is caused as a result of energy management is known as "indirect damage." In FIG. 17, indirect damage 1703 has occurred to the roof of vehicle 1701 resulting in a rippled roof.

Embodiments of the inspection facilitator can be used to identify such direct and indirect damage after a collision. In particular, the inspection process responds to inputs of measurements pertaining to direct damage and further guides an inspection and/or repair process of related indirect damage if indirect damage has occurred. The guiding of the repair process may present a precise ordering of repair steps to insure that the direct and indirect damage is corrected according to the manufacturer's prescribed order so that the integrity of the energy management design of the vehicle is maintained.

Knowing the energy management design of a particular vehicle, which is determined by the inspection facilitator based upon the manufacturer's specifications, standard repair procedures, and its built-in "rules," the inspection facilitator can determine what specific areas should be inspected and in what order. For example, the shock waves of a particular energy management design can be used by the inspection facilitator to request the technician (or estimator or other performer of the inspection facilitator) to investigate particular portions of the vehicle.

Figure 18:
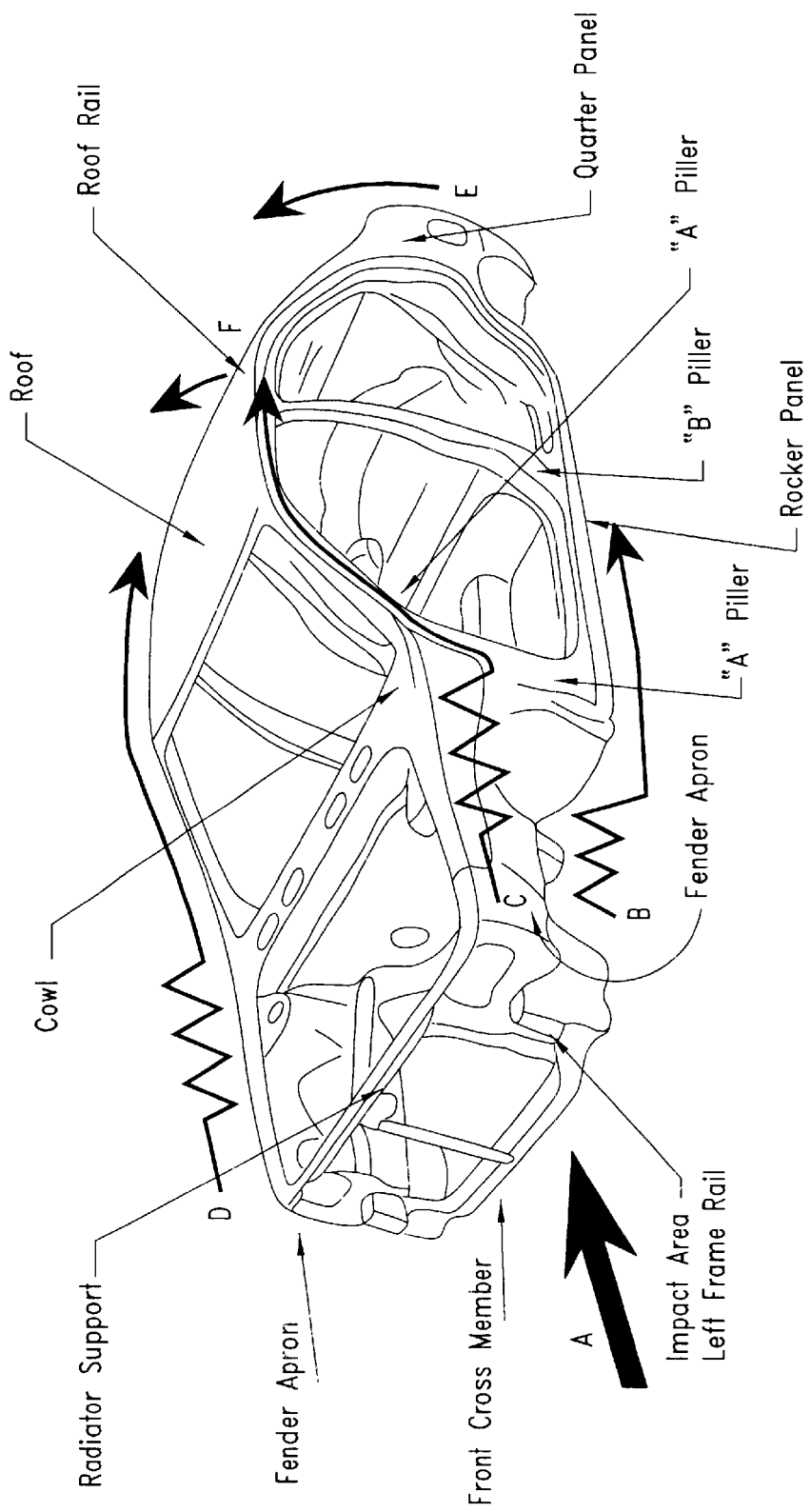
FIG. 18 is a block diagram of an example energy management design of a vehicle and the identification of the portions of the vehicle that may be affected when a collision occurs to the left frame rail of a vehicle.

FIG. 18 is a block diagram of an example energy management design of a vehicle and the identification of the portions of the vehicle that may be affected when a collision occurs to the left frame rail of a vehicle. The inspection facilitator, having access to information for the vehicle similar to that shown in FIG. 18, would request, an inspection of each of the areas that could be affected by shock waves B, C, D, E, and F. When any nonconformities are indicated, the inspection facilitator would request further inspection of additional areas. For example, if the technician indicates that the left fender apron has moved rearward, then the inspection facilitator may request an inspection of the roof.

FIGS. 19–22 provide an example sequence of display screens produced by the inspection facilitator to direct and guide an example inspection of a vehicle to determine proper repairs when the vehicle has sustained impact to the left frame rail.

Figure 19:
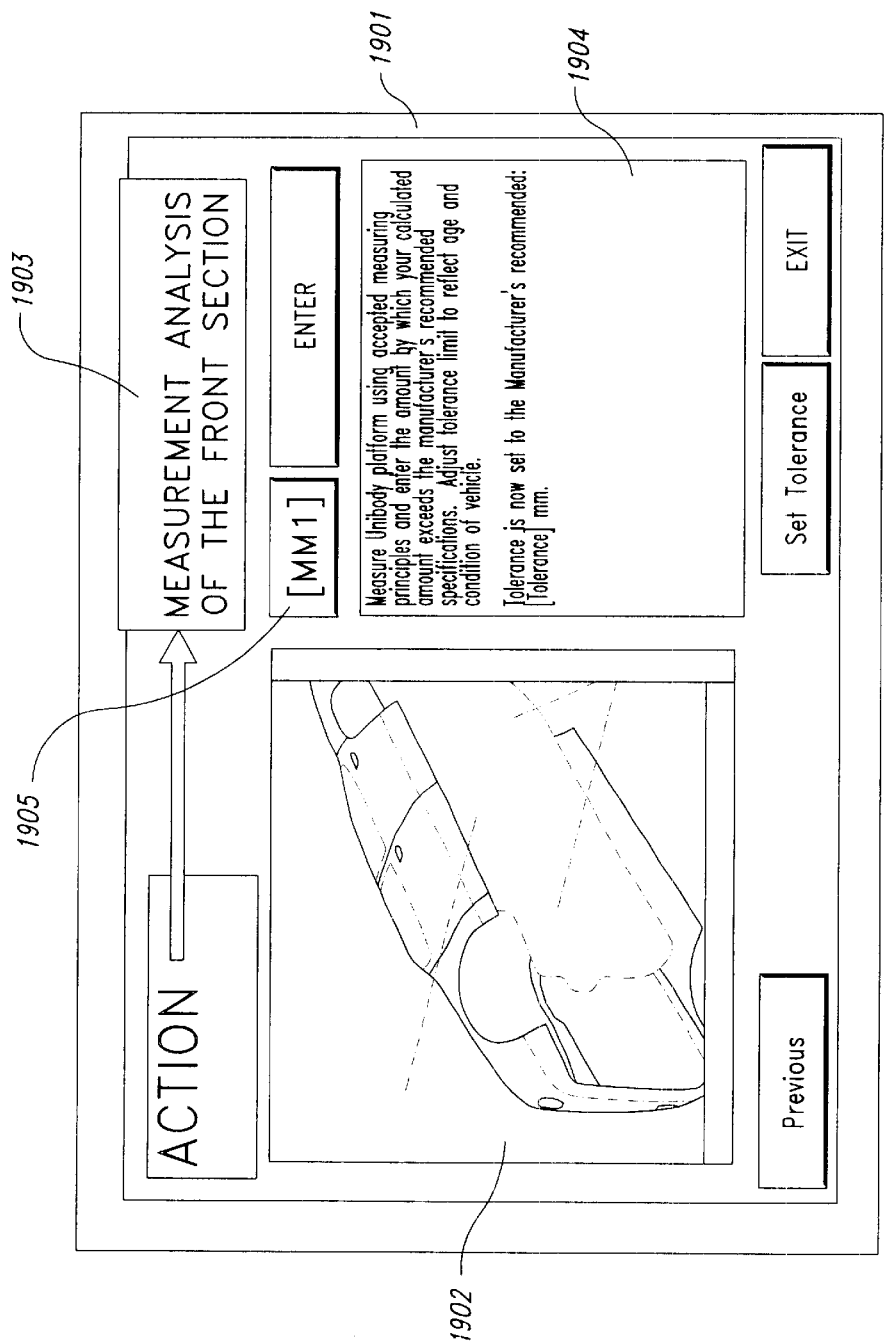
FIG. 19 is an example display screen generated and presented by the inspection facilitator to request the input of measurements pertaining to the underbody of the vehicle.

FIG. 19 is an example display screen generated and presented by the inspection facilitator to request the input of measurements pertaining to the front section of the underbody of the vehicle (e.g., the unibody platform). The inspection facilitator indicates in task identification area 1903 and instruction display area 1904 that the technician should measure and indicate any misalignment of the underbody. If the inspection facilitator receives an indication in input area 1905 that the front section is out of alignment based upon manufacturer's tolerances for the vehicle, then the inspection facilitator will maintain information that there is direct damage and continue with the inspection process to guide the location of indirect damage. For the purposes of this example, it is assumed that the inspection facilitator receives an indication that the measurements of left frame rail and front cross-member (see FIG. 18) are outside of permissible tolerances. In particular, the example assumes that the left frame rail is too short and too high.

Figure 20:
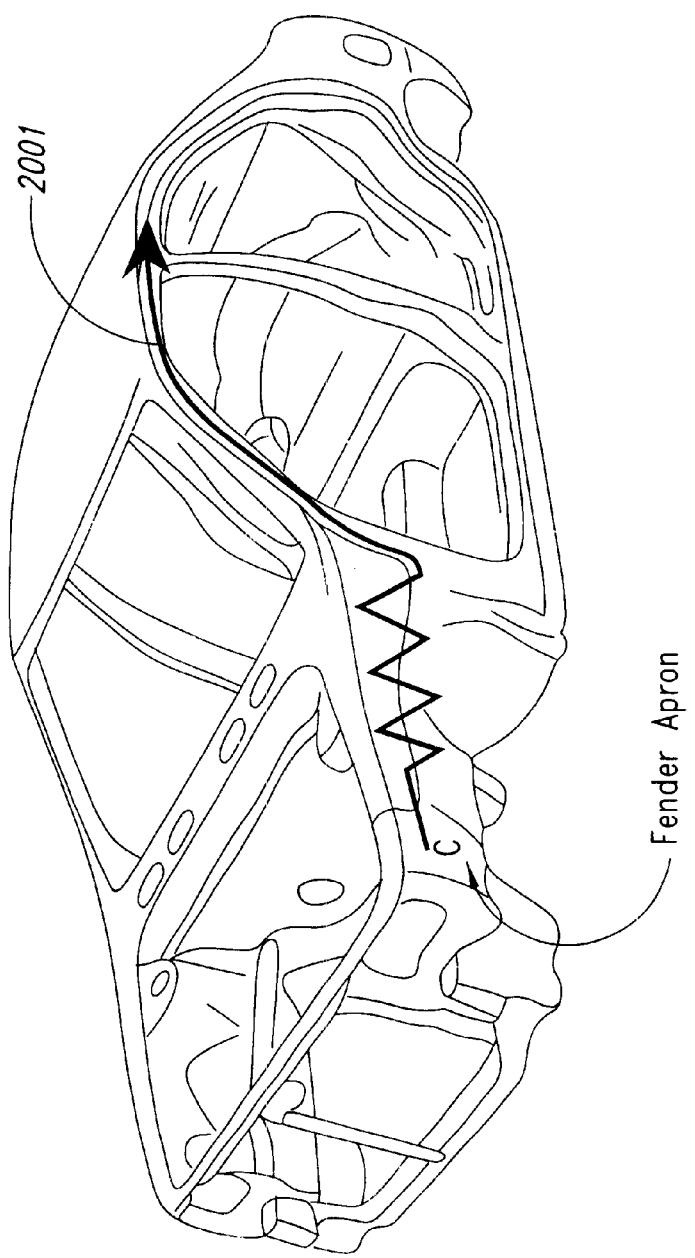
FIG. 20 is an example block diagram of a shock wave path followed in an example collision.

In response to this input, the inspection facilitator uses the appropriate manufacturing specifications and repair guidelines to determine the energy management design aspects at issue and uses this information to automatically generate the next sequence of inspection steps. FIG. 20 is an example block diagram of a shock wave path followed in this example collision. In this case, the inspection facilitator determines that a shock wave 2001 followed line C in FIG. 20, and will generate additional inspection steps accordingly.

Figure 21:
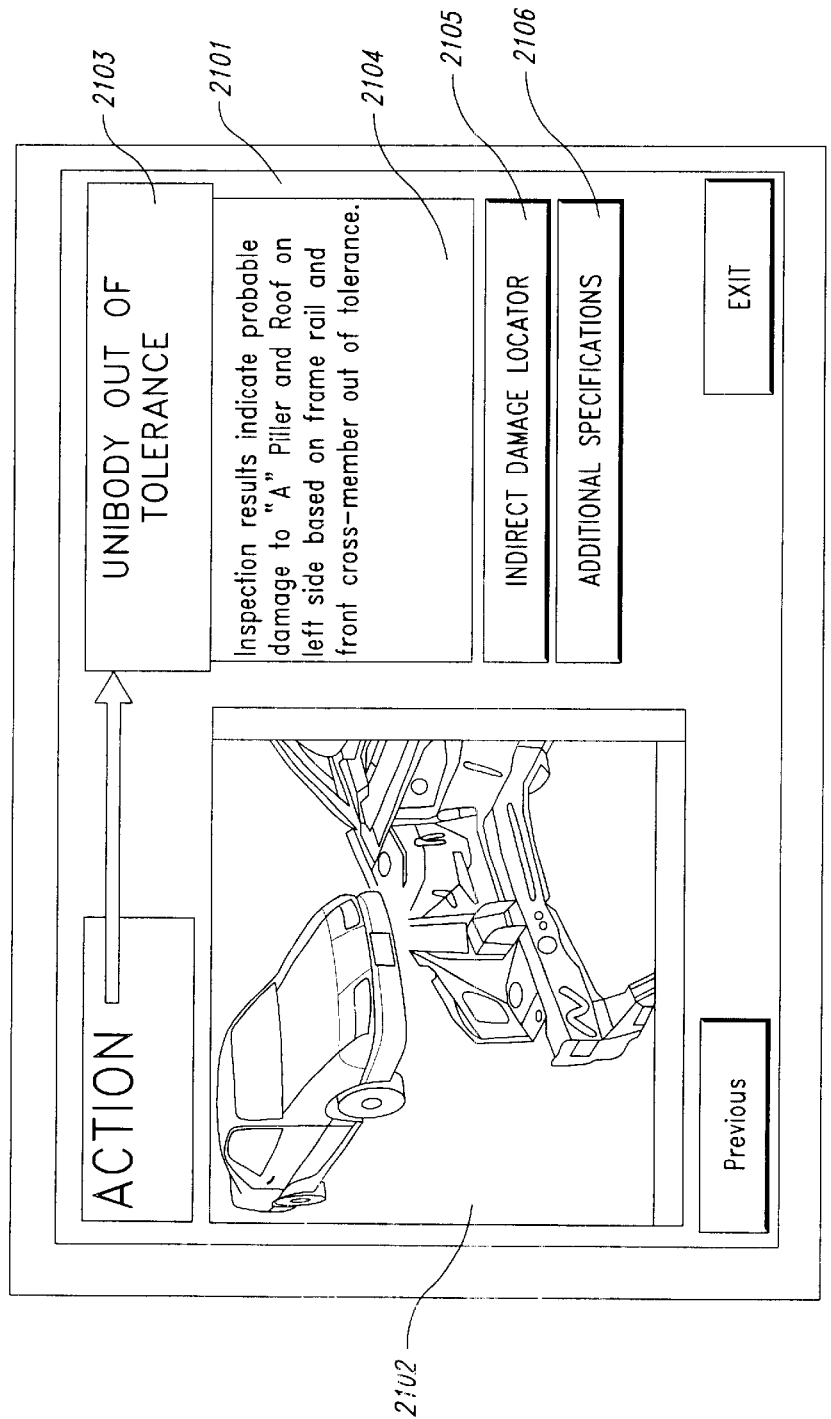
FIG. 21 is an example display screen generated and presented by the inspection facilitator to direct an inspection for indirect damage.

FIG. 21 is an example display screen generated and presented by the inspection facilitator to direct an inspection for indirect damage. Based upon previous indications that the frame rail and the front cross-member are out of alignment tolerances, the inspection facilitator determines that there is likely damage to the "A" Pillar and the roof. The instruction display area 2104 therefore indicates that there is probable damage to the "A" Pillar and Roof on the left side. The inspection facilitator enables the inspection process to continue by receiving a selection of pushbutton 2105 and enables the technician to retrieve relevant specifications by receiving a selection of pushbutton 2106.

Figure 22:
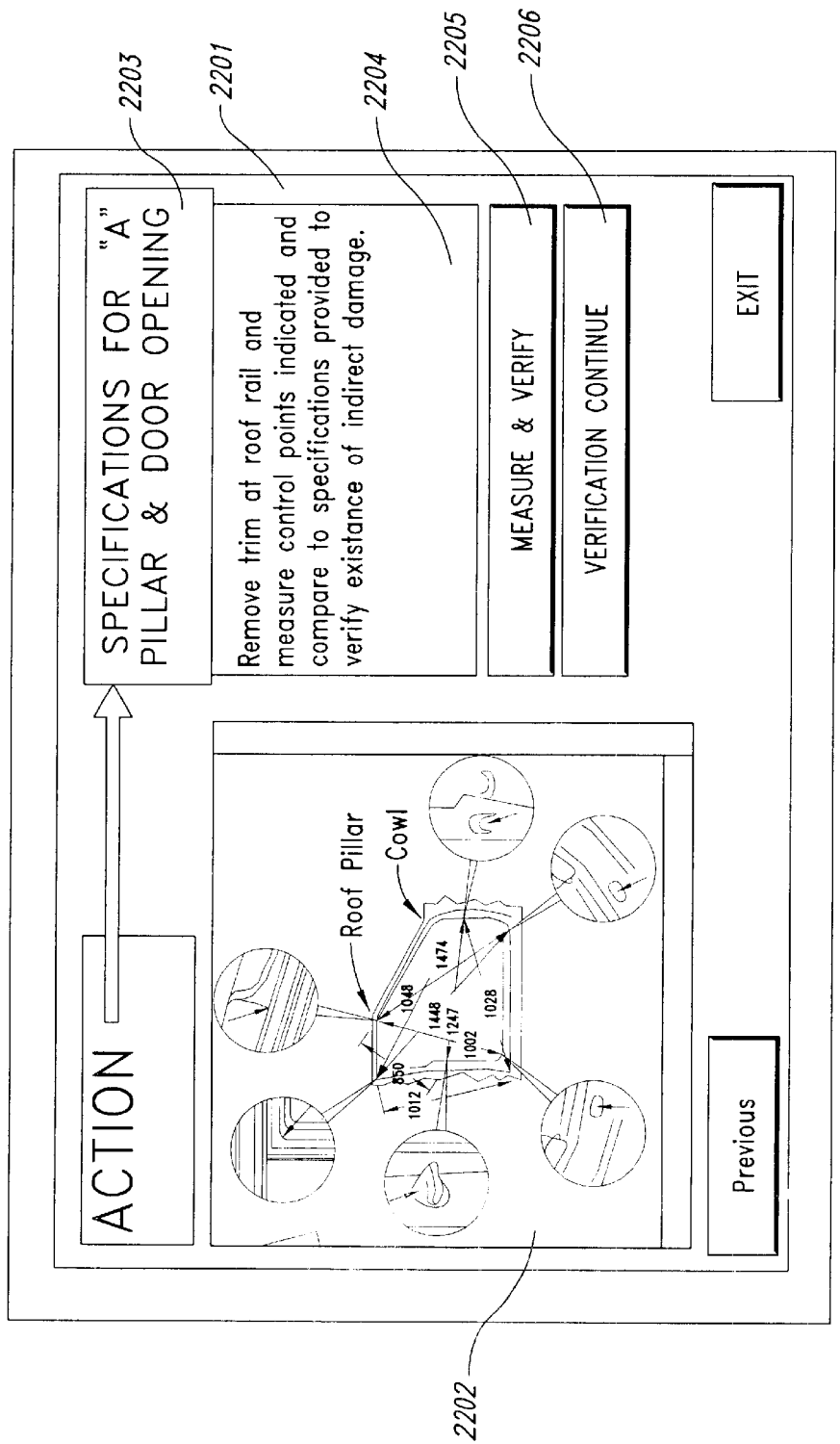
FIG. 22 is an example display screen generated and presented by the inspection facilitator to direct a further inspection of the indirect damage.

FIG. 22 is an example display screen generated and presented by the inspection facilitator to direct a further inspection of the indirect damage. In particular, the task identification area 2203 directs an inspection of the "A" Pillar and door opening for indirect damage. The instruction display area 2204 indicates specifically how the technician should perform this particular step in the inspection process. The graphics area 2202 indicates where the particular measurements should be taken and what they should be. These measurements are generated from the manufacturer's specifications based upon the particular vehicle. One skilled in the art will recognize that any or all of these inspection steps that request measurement inputs may be used in conjunction with computer based measuring systems to obtain measurement data. Once the measurements have been inputted using pushbuttons 2205 and 2206, the inspection facilitator continues to determine proper repair procedures.

Figure 23:
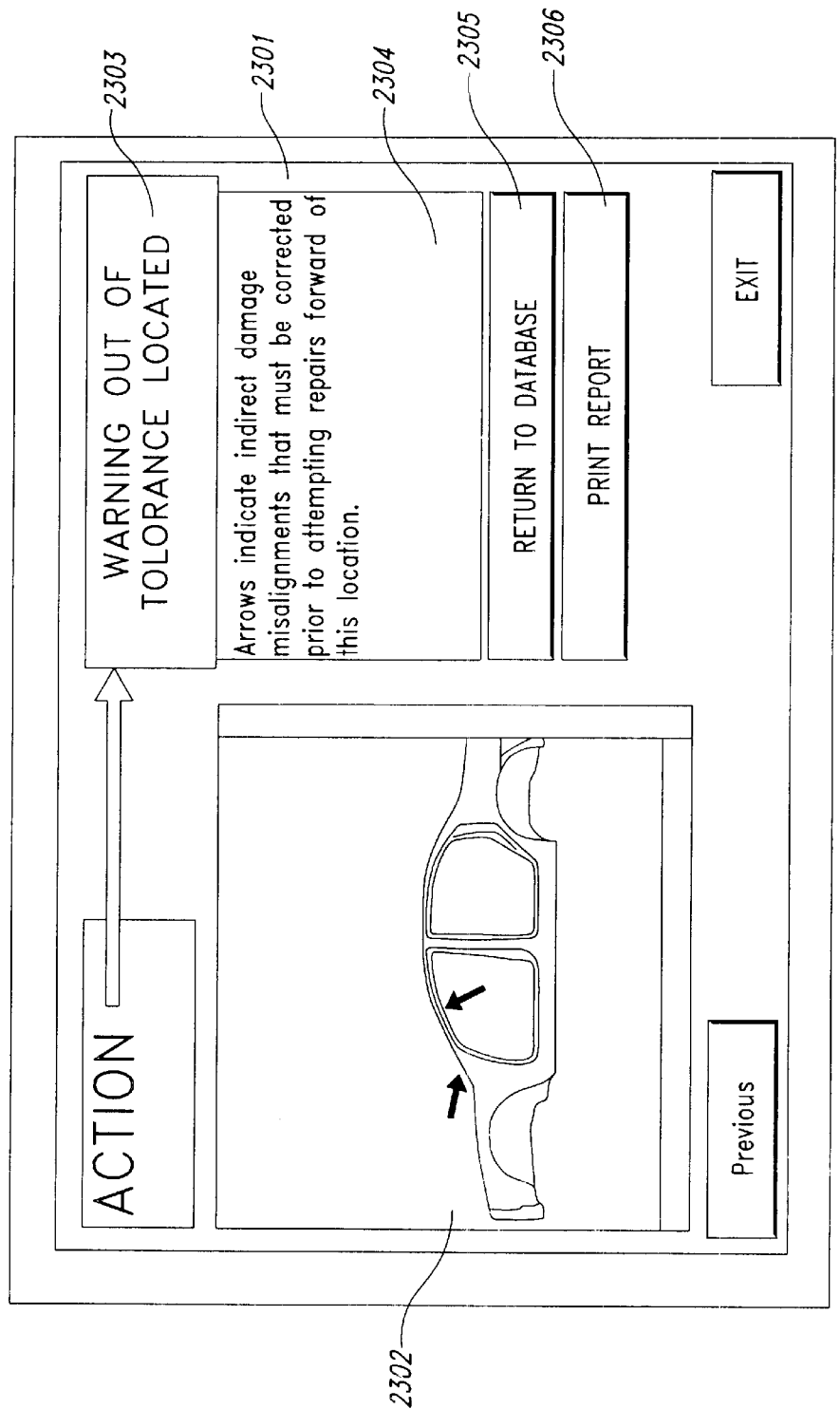
FIG. 23 is an example display screen generated and presented by the inspection facilitator to indicate repairs that need to be performed.

FIG. 23 is an example display screen generated and presented by the inspection facilitator to indicate repairs that need to be performed. The graphics area 2302 shows where the particular misalignments due to indirect damage have appeared. Instruction display area 2304 describes the repairs to be performed and indicates that the indirect damage should be repaired prior to the direct damage. One skilled in the art will appreciate that the desired ordering of repair procedures is controllable by the inspection facilitator. The "Return to Database" pushbutton 2305 allows the technician to retrieve appropriate repair information. The "Print Report" pushbutton 2306 allows the technician to print out the list of damage and necessary repair descriptions. One skilled in the art will recognize that this output function could contain any type of reporting information, including other types of repair information like part cost and availability, which a person or system estimating repairs might need. One skilled in the art will also recognize that additional inspection and display screens would be presented by the inspection facilitator as various nonconformities are indicated and depending upon the particular vehicle portions affected by the collision.

Also, the example described with reference to FIGS. 18–23 involves a frontal collision. One skilled in the art will recognize that these same principles and techniques are used by the inspection facilitator to locate indirect damage caused by impact to any portion of the vehicle. For example, a hit sustained to one side of the vehicle, will result in the inspection facilitator requesting an inspection of the other side of the vehicle, if the energy management design of the vehicle so indicates.

Figure 24:
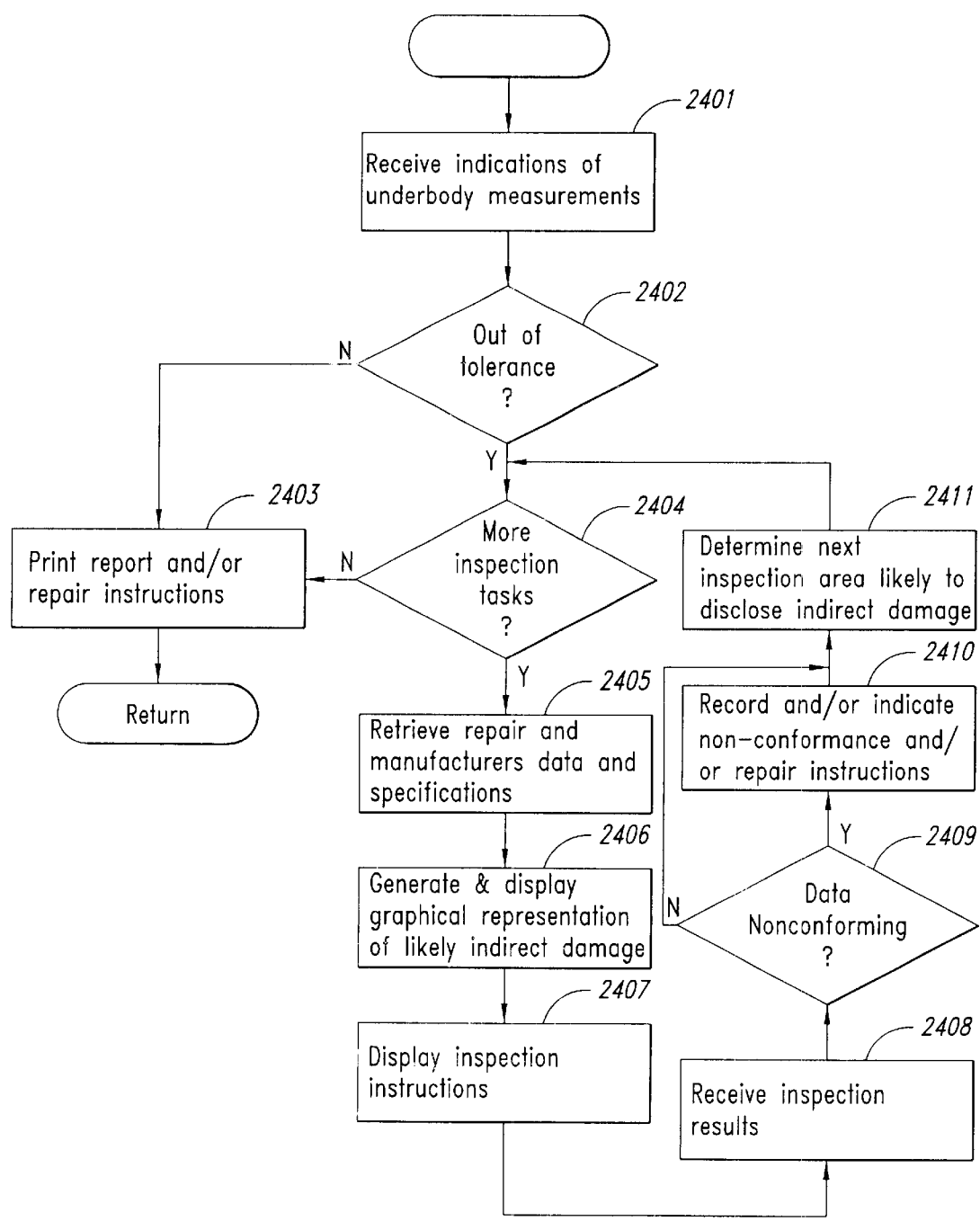
FIG. 24 is an flow diagram of example steps performed by the inspection facilitator to direct each inspection task during the inspection process for direct and indirect damage.

FIG. 24 is an flow diagram of example steps performed by the inspection facilitator to direct each inspection task during the inspection process for direct and indirect damage. In step 2401, the inspection facilitator receives indications of the underbody measurements as described, for example, with reference to FIG. 19. In step 2402, the inspection facilitator determines whether the received measurements are out of permitted tolerances for that particular vehicle, and if so continues at step 2404, else continues in step 2403. Steps 2404–2411 are a loop to execute a series of one or more inspection steps. In step 2404, the inspection facilitator determines whether there are additional inspection steps to perform and, if so, continues at step 2405, else continues in step 2403. When implemented using, for example, an expert system as described above, the step is determined using the inference engine of the inspection facilitator with its heuristics and encoded rules. In step 2405, the inspection facilitator retrieves repair and manufacturer's data and specifications to use to determine additional inspection steps (indirect damage). One skilled in the art will recognize that the retrieval of such data can be performed at other times, including during initialization processing, but one may want it to be performed in the loop to retrieve additional data and specifications as needed. In step 2406, the inspection facilitator generates and displays a graphical representation of likely indirect damage as part of the next inspection task. In step 2407, the inspection facilitator displays inspection instructions to guide the technician/estimator in performing the indicated inspection. In step 2408, the inspection facilitator receives inspection results inputted by the technician/estimator or by a measuring device. In step 2409, the inspection facilitator determines whether the received data is nonconforming and, if so, continues in step 2410 to store data recording the nonconformity and/or indicate an appropriate repair instruction, else continues in step 2411. In step 2411, the inspection facilitator determines the next area of the vehicle to be inspected based upon the likelihood of locating additional indirect damage and continues at the beginning of the loop with step 2404. In step 2403, after the inspection loop is executed, the inspection facilitator prints out a report and/or repair instructions as appropriate. One skilled in the art will recognize that one or more of these steps are optional and that the ordering may be changed and still operate as contemplated.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to other areas of vehicle inspections, such as heating, ventilation, and air conditioning systems. In addition, the teachings may be applied to other types of conveyances or devices requiring after-repair inspections, such as vessels employed in water environments, small and large atmospheric aircraft, extra-atmospheric aircraft, and other craft. These and other changes may be made to the invention in light of the above detailed description. Accordingly, the invention is not limited by the disclosure, but instead the scope of the present invention is to be determined by the following claims.

What is claimed is:

1. A method in a computer system for detecting damage to a vehicle, the method comprising:
   receiving an indication of a nonconformity that is indicative of direct damage to the vehicle;
   based upon the received indication, automatically determining one or more areas likely to reveal a nonconformity due to indirect damage and generating instructions to inspect the determined one or more areas;
   receiving an indication of the results of inspecting the determined one or more areas; and
   producing an indication of the results.

2. The method of claim 1 wherein the received indication of the nonconformity that is indicative of direct damage reflects misalignment of the underbody.

3. The method of claim 1 wherein the receiving of the indication of the nonconformity that is indicative of direct damage is received from a measuring device.

4. The method of claim 1 wherein the automatic determining of the one or more areas and the generating of inspection instructions are performed by an inference engine.

5. The method of claim 1 wherein the generated instructions to inspect the determined one or more areas are instructions to inspect areas of the outerbody of the vehicle.

6. The method of claim 1 wherein the automatic determining of the one or more areas is based on the energy management design of the vehicle.

7. The method of claim 1, further comprising generating instructions to repair the vehicle in accordance with the received indications of results of inspecting the determined one or more areas.

8. The method of claim 7 wherein the repair instructions are generated in an order that guides repair of the indirect damage to the vehicle prior to repair of the direct damage.

9. The method of claim 1 wherein the producing the indication of the results produces a report that indicates needed repair to the vehicle.

10. The method of claim 1, further comprising using the inspection results to generate an estimate of at least one of damage and repair.

11. The method of claim 10 wherein the estimate is a cost estimate for repairing the vehicle.

12. A computer-based method of facilitating repair of damage to a vehicle, the method comprising:
   retrieving a vehicle-related specification;
   receiving an indication of a nonconformity of the vehicle relative to the retrieved specification; and
   based upon the received indication of the nonconformity, automatically directing an inspection and repair of the vehicle by repeating acts of:
      indicating areas to inspect;
      receiving the result of inspecting the indicated area; and
      when the received results indicate a nonconformity, indicating repair procedures;
   until no additional nonconformities are indicated by the received results.

13. The method of claim 12 wherein the automatic directing of the inspection and repair are performed by an inference engine.

14. The method of claim 12 wherein the received indication of the nonconformity is indicative of direct damage.

15. The method of claim 12 wherein a nonconformity indicated by a received result during the inspection is indicative of indirect damage.

16. The method of claim 12, further comprising using the received results to generate an estimate of at least one of damage and repair.

17. A method in a computer system for facilitating a retrospective inspection of a vehicle to determine the existence of indirect damage comprising:
- receiving an indication of direct damage to the vehicle;
- using an inference engine, automatically directing an inspection of the vehicle to indicate areas of inspection likely to reveal indirect damage to the vehicle;
- receiving results from the directed inspection; and
- indicating whether indirect damage to the vehicle has occurred.

18. The method of claim 17 further comprising automatically generating a repair estimate based upon the indicated direct and indirect damage.

19. The method of claim 17 further comprising automatically generating a sequence of repair steps based upon the received results from the directed inspection.

20. The method of claim 17, further comprising automatically generating, based upon the results, an estimate of at least one of damage and repair.

21. A computer-based inspection system comprising:
- an inspection engine that,
  - receives an indication of initial damage to a vehicle;
  - automatically generates a sequence of inspection steps based upon the inspection results received at each step to determine the presence of additional damage; and
  - when additional damage is detected, generates a sequence of repair instructions ordered to correct detected additional damage prior to indicated initial damage; and
- an inspection interface that,
  - directs an inspection according to the sequence of inspection steps generated by the inspection engine; and
  - receives indications of nonconformities and forwards the received indications to the inspection engine as inspection results.

22. The computer-based inspection system of claim 21 wherein the initial damage is direct damage and at least a portion of the additional damage is indirect damage.

23. The computer-based inspection system of claim 21 wherein the automatic generation of the sequence of inspection steps is performed by an inference engine.

24. The inspection system of claim 21 wherein the inspection engine automatically generates an estimate of at least one of damage and repair that reflects any detected additional damage.

25. A computer-readable storage medium containing instructions that control a computer processor to facilitate a retrospective inspection of a vehicle to determine the existence of indirect damage by:
- receiving an indication of direct damage to the vehicle;
- using an inference engine, automatically directing an inspection of the vehicle to indicate areas of inspection likely to reveal indirect damage to the vehicle;
- receiving results from the directed inspection; and
- indicating whether indirect damage to the vehicle has occurred.

26. The computer-readable storage medium of claim 25 further containing instructions that control a computer processor by automatically generating a repair estimate based upon the indicated direct and indirect damage.

27. The computer-readable storage medium of claim 25 further containing instructions that control a computer processor by automatically generating a sequence of repair steps.

28. The storage medium of claim 25, further containing instructions that control the computer processor to automatically generate, based upon the results, an estimate of at least one of damage and repair.

29. A computer-readable storage medium containing instructions that control a computer processor to facilitate the detection of damage to a vehicle, by:
- receiving an indication of a nonconformity that is indicative of direct damage to the vehicle;
- based upon the received indication, automatically determining one or more areas likely to reveal a nonconformity due to indirect damage and generating instructions to inspect the determined one or more areas; and
- receiving an indication of the results of inspecting the determined one or more areas.

30. The computer-readable storage medium of claim 29 wherein the determining of areas and generating of instructions to inspect are performed by an inference engine.

31. The computer-readable storage medium of claim 29 wherein the determining of areas and generating of instructions are based upon knowledge of the energy management design of the vehicle.

32. The storage medium of claim 29, further containing instructions that control the computer processor to use the inspection results to generate an estimate of at least one of damage and repair.

33. A computer-readable storage medium containing instructions that control a computer processor to detect damage to a vehicle based upon the energy management design of the vehicle by:
- receiving an indication of initial damage;
- based upon the location and force of impact of the initial damage indicated, determining other areas of the vehicle that may have experienced damage caused by shock waves initiating from a point of impact; and
- automatically generating a sequence of inspection steps based upon the determined other areas, so that additional damage can be detected.

34. The computer-readable storage medium of claim 33 wherein the automatic generation of the sequence of inspection steps is performed by an inference engine.

35. The computer-readable storage medium of claim 33 wherein the initial damage is direct damage and the automatically generated sequence of inspection steps guide the detection of indirect damage.

36. The storage medium of claim 33, further containing instructions that control the computer processor by:
- receiving indications of damage based upon an inspection performed according to the generated inspection steps; and
- automatically generating an estimate based upon the indicated damage.

37. The storage medium of claim 36 wherein the estimate is a cost estimate for repairing the vehicle.

38. A computer-readable storage medium containing instructions that control a computer processor to facilitate inspection of a vehicle to detect damage and problems with previous repair, the vehicle having a plurality of portions, by:
- retrieving vehicle specifications and repair specifications;
- determining whether at least one of damage and repair has occurred to the vehicle by receiving an indication of the existence of a nonconformity of a first portion of the vehicle to the retrieved vehicle specifications;
- when it is determined that at least one of damage and repair has occurred to the vehicle, automatically generating and indicating inspection instructions based upon the indicated nonconformities of the first portion of the vehicle;

receiving an indication of whether previous repair work to a second portion of the vehicle has been performed; and when the indication of previous repair work indicates that previous repair work was performed, receiving indications of repair nonconformities, the repair nonconformities based upon the retrieved repair specifications; and determining an overall condition of the vehicle based upon the received indications of repair nonconformities.

39. The computer-readable storage medium of claim 38 wherein the automatic generation and indication of inspection instructions are performed by an inference engine.

40. The computer-readable storage medium of claim 38 wherein the overall condition indicates one of: the vehicle has been damaged but was repaired properly; the vehicle has been damaged but was not repaired properly; and the vehicle has been damaged and poses a safety hazard.

41. The storage medium of claim 38, further containing instructions that control the computer processor by determining an estimate for repairing the vehicle to alleviate indicated nonconformities.

42. A computer-readable storage medium containing instructions that control a computer processor to facilitate a retrospective inspection of a vehicle to determine the existence and quality of prior repair or the existence of prior damage by:

receiving indications of nonconformities that are indicative of prior repair or prior damage;

using an inference engine, automatically directing the inspection of the vehicle to indicate areas of inspection based upon the received indications of nonconformities;

for each indicated nonconformity, encoding an inspection result; and storing the encoded inspection results in a manner that indicates the condition of the vehicle.

43. The computer-readable storage medium of claim 42 wherein the encoded inspection results are coalesced into a single encoding and stored as a single encoding.

44. The computer-readable storage medium of claim 43, further containing instructions that control a computer processor by:

retrieving the stored single encoding of the inspection results; and decomposing the retrieved encoding into individual encoded inspection results so that the nonconformities indicated during the inspection can be retrieved.

45. The computer-readable storage medium of claim 42 wherein each encoding of an inspection result encodes a location of the nonconformity on the vehicle and a weighting of the nonconformity that indicates the severity of the nonconformity.

46. The computer-readable storage medium of claim 42, further containing instructions that control a computer processor by:

computing an overall defect rating based upon the encoded inspection results further qualified by overall rating qualifiers; and storing the overall defect rating.

47. The storage medium of claim 42, further containing instructions that control the computer processor by generating an estimate for repairing each indicated nonconformity.

48. A computer-readable storage medium containing instructions that control a computer processor to facilitate a retrospective inspection of a vehicle to assess prior repair or damage by:

receiving an indication of a nonconformity that is potentially indicative of prior repair or damage;

retrospectively determining a set of repair steps that should have been performed to the vehicle to avoid the indicated nonconformity;

automatically directing an inspection of the vehicle according to the determined set of repair steps to identify whether damage was sustained to the vehicle and whether each repair step, if performed, was properly performed;

receiving a plurality of inspection results; and determining from the received inspection results an overall assessment of the vehicle that indicates whether the vehicle sustained damage and whether the vehicle was repaired properly.

49. The computer-readable storage medium of claim 48 wherein the automatic direction of the inspection is provided by an inference engine.

50. The computer-readable storage medium of claim 48, further containing instructions that control a computer processor by:

coalescing the received inspection results into a single encoded inspection result; and storing the single encoded inspection result as part of an identity of the vehicle.

51. A method in a computer system for estimating damage to a vehicle, comprising:

receiving an indication of initial damage to the vehicle;

using an inference engine, directing an inspection of the vehicle to indicate areas of inspection likely to reveal additional damage to the vehicle;

receiving results from the directed inspection including indications of whether additional damage has occurred to the vehicle; and determining an estimate of the indicated damage.

52. The method of claim 51 wherein the directed inspection is based upon the energy management design of the vehicle.

53. The method of claim 51, further comprising generating a sequence of repair instructions based upon the indications of initial and additional damage.

54. The method of claim 51 wherein the determined estimate is part of an insurance cost estimate output.

55. A vehicle damage estimating system comprising:

inference engine structured to receive an indication of initial damage;

generate a sequence of inspection steps based upon the results received at each prior step and direct an inspection according to each step to determine the presence of additional damage; and determine an estimate of the initial and additional damage.

56. The system of claim 55 wherein the generated sequence of inspection steps is based upon the energy management design of the vehicle.

57. The system of claim 55 wherein the inference engine is further structured to generate a sequence of repair instructions based upon the indications of initial and additional damage.

58. The system of claim 55 wherein the determined estimate is part of an insurance cost estimate output.

59. A computer-readable storage medium containing instructions for controlling a computer processor to estimate damage to a vehicle, by:

receiving an indication of initial damage to the vehicle;

using an inference engine, directing an inspection of the vehicle to indicate areas of inspection likely to reveal additional damage to the vehicle;

receiving results from the directed inspection including indications of whether additional damage has occurred to the vehicle; and determining an estimate of the indicated damage.

60. The computer-readable storage medium of claim 59 wherein the directed inspection is based upon the energy management design of the vehicle.

61. The computer-readable storage medium of claim 59, further containing instructions that control a computer processor by generating a sequence of repair instructions based upon the indications of initial and additional damage.

62. The computer-readable storage medium of claim 59 wherein the determined estimate is part of an insurance cost estimate output.

* * * * *